(12) United States Patent
Munier et al.

(10) Patent No.: US 12,160,382 B2
(45) Date of Patent: Dec. 3, 2024

(54) METHODS AND APPARATUSES FOR POSITIONING BASED ON THE SOUNDING REFERENCE SIGNAL

(71) Applicant: Telefonaktiebolaget LM Ericsson (PUBL), Stockholm (SE)

(72) Inventors: Florent Munier, Västra Frölunda (SE); Per Ernström, Stockholm (SE); Erik Stare, Sollentuna (SE); Fredrik Gunnarsson, Linköping (SE); Johannes Nygren, Uppsala (SE); Satyam Dwivedi, Solna (SE); Ritesh Shreevastav, Upplands Väsby (SE); Iana Siomina, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 425 days.

(21) Appl. No.: 17/420,576

(22) PCT Filed: Jan. 13, 2020

(86) PCT No.: PCT/SE2020/050024
§ 371 (c)(1),
(2) Date: Jul. 2, 2021

(87) PCT Pub. No.: WO2020/145879
PCT Pub. Date: Jul. 16, 2020

(65) Prior Publication Data
US 2022/0123886 A1    Apr. 21, 2022

Related U.S. Application Data

(60) Provisional application No. 62/791,482, filed on Jan. 11, 2019.

(51) Int. Cl.
*H04L 5/00*   (2006.01)
*H04L 27/26*  (2006.01)
*H04W 4/029*  (2018.01)

(52) U.S. Cl.
CPC .......... *H04L 5/0048* (2013.01); *H04L 27/261* (2013.01); *H04W 4/029* (2018.02)

(58) Field of Classification Search
USPC .......................................................... 370/329
See application file for complete search history.

(56) References Cited

U.S. PATENT DOCUMENTS

| 2011/0098054 A1 | 4/2011 | Gorokhov et al. |
| 2011/0116436 A1* | 5/2011 | Bachu ................. H04L 5/0053 370/312 |

(Continued)

FOREIGN PATENT DOCUMENTS

WO    2018 126441 A1    7/2018

OTHER PUBLICATIONS

3GPP TSG RAN WG1 Meeting #95; Spokane, USA; Source: vivo; Title: Considerations on Techniques for NR positioning (R1-1812337)—Nov. 12-16, 2018.

(Continued)

*Primary Examiner* — Gary Mui
*Assistant Examiner* — Hooman Houshmand
(74) *Attorney, Agent, or Firm* — Baker Botts L.L.P.

(57) ABSTRACT

A method performed by a user equipment, UE includes obtaining a Sounding Reference Signal, SRS, configuration from a network node and determining an SRS waveform and transmitting the SRS waveform. The SRS waveform is adapted for positioning based on the SRS configuration to have a full bandwidth within a bandwidth applicable for the SRS waveform.

23 Claims, 23 Drawing Sheets

(56) References Cited

U.S. PATENT DOCUMENTS

| | | | |
|---|---|---|---|
| 2014/0126530 A1 | 5/2014 | Siomina et al. | |
| 2015/0257118 A1* | 9/2015 | Siomina | H04B 17/21 |
| | | | 455/456.1 |
| 2016/0029331 A1 | 1/2016 | Seo et al. | |
| 2018/0167895 A1 | 6/2018 | Lee et al. | |
| 2019/0104431 A1* | 4/2019 | Gunnarsson | H04L 5/0048 |
| 2019/0149307 A1* | 5/2019 | Siomina | H04W 16/14 |
| | | | 370/252 |
| 2020/0007375 A1* | 1/2020 | Zhang | H04L 5/0048 |
| 2020/0014507 A1* | 1/2020 | Joseph | H04W 72/23 |
| 2020/0022167 A1* | 1/2020 | Manolakos | H04L 5/0048 |

OTHER PUBLICATIONS

PCT International Search Report issued for International application No. PCT/SE2020/050024—Aug. 19, 2020.
First Office Action issued by the China National Intellectual Property Administration for Application No. 202080008780.8—Dec. 9, 2023.

* cited by examiner

METHODS AND APPARATUSES FOR POSITIONING BASED ON THE SOUNDING REFERENCE SIGNAL

PRIORITY

This nonprovisional application is a U.S. National Stage Filing under 35 U.S.C. § 371 of International Patent Application Serial No. PCT/SE2020/050024 filed Jan. 13, 2020 and entitled "METHODS AND APPARATUSES FOR POSITIONING BASED ON THE SOUNDING REFERENCE SIGNAL" which claims priority to U.S. Provisional Patent Application No. 62/791,482 filed Jan. 11, 2019 both of which are hereby incorporated by reference in their entirety.

TECHNICAL FIELD

The present disclosure relates, in general, to wireless communications and, more particularly, methods and apparatuses for positioning based on the sounding reference signal.

BACKGROUND

Positioning using uplink signals has been a topic in Long-Term Evolution (LTE) standardization since 3$^{rd}$ Generation Partnership Project (3GPP) Release 9. The primary objective is to fulfill regulatory requirements for emergency call positioning. FIG. 1 illustrates NG-RAN Release 15 LCS protocols. Positioning in New Radio (NR) is proposed to be supported by the architecture shown in FIG. 1. LMF is the location server in NR. There are also interactions between the location server and the gNodeB (gNB) via the NR Positioning Protocol A (NRPPa) protocol. The interactions between the gNodeB and the device is supported via the Radio Resource Control (RRC) protocol.

It is noted, however, that FIG. 1 is provided as just one example architecture for positioning. It is recognized that the gNB and Next Generation-eNodeB (ng-eNB) may not always both be present. Further, when both the gNB and ng-eNB are present, the NG-C interface is only present for one of them.

In the legacy LTE standards, the following techniques are supported:
Enhanced Cell identifier (Cell ID): Essentially cell ID information to associate the device to the serving area of a serving cell, and then additional information to determine a finer granularity position.
Assisted Global Navigation Satellite System (GNSS): GNSS information retrieved by the device, supported by assistance information provided to the device from Evolved-Serving Mobile Location Center (E-SMLC)
OTDOA (Observed Time Difference of Arrival): The device estimates the time difference of reference signals from different base stations and sends to the E-SMLC for multilateration.
UTDOA (Uplink TDOA): The device is requested to transmit a specific waveform that is detected by multiple location measurement units (e.g. an eNodeB (eNB)) at known positions. These measurements are forwarded to E-SMLC for multilateration.

NR, as compared to its previous predecessor (LTE/Universal Mobile Telecommunication System (UMTS)), provides more flexibility and allows more dynamic change, for instance by considering user equipment (UE) movements and fast changing radio propagation models. Many physical channels are being introduced in a more dynamic fashion.

In NR, positioning has not yet been specified but some of the reference signals specified for other purposes could also be utilized for positioning. As an example, in downlink (DL), the Channel State Information-Reference Signal (CSI RS) for tracking could be utilized for Time of Arrival (TOA) measurements, while sounding reference signal (SRS) is candidates for NR uplink (UL) positioning The SRS is used in NR to enable uplink channel sounding from a device, a similar role to that of CSI-RS in the downlink. The SRS is constructed using the low-cubic metric Zadoff-Chu sequences (ZF) over the transmitting bandwidth. Four antenna ports are dedicated to SRS. Each port is transmitted using an different cyclic shift in the ZF sequence. In 3GPP, a configuration of SRS in the frequency-time domain is referred to a resource. Multiple resources can be combined in a resource set. A resource is defined as a number (1, 2, or 4) consecutive Orthogonal Frequency Division Multiplexing (OFDM) symbols given by the field nrofSymbols contained in the higher layer parameter resourceMapping.

In the frequency domain, the allocated bandwidth in configured by higher layer in a number of physical resource block, based on the parameters included in the higher layer parameter freqHopping. It should be also mentioned that an SRS has a so-called "comb" structure, implying that an SRS is transmitted on every Nth subcarrier where N can take the values two or four ("comb-2" and "comb-4," respectively).

For time resource allocation, the resource is controlled by the startPosition parameter which gives an offset to the SRS position, counting backward from the end of the slot. In the frequency domain, the resource start position is controlled by the parameter freqDomainShift plus a comb offset. FIG. 2 illustrates an example time resource allocation. More specifically, FIG. 2 illustrates SRS positioning of the slot.

Certain problems exist. For example, there is currently no method for uplink based positioning in the 3GPP 5$^{th}$ generation network known as the NR. In the previous generation (LTE), SRS based UTDOA was available. In order to provide sufficient orthogonal resources (UE multiplexing), it is desirable to create a configuration for SRS that exploits in a flexible way all the orthogonal dimensions in SRS such as, for example, cyclic shift, frequency hopping, comb offset, and slot offset.

SUMMARY

Certain aspects of the present disclosure and their embodiments may provide solutions to these and/or other challenges. For example, according to certain embodiments, a method is provided for configuring SRS transmissions for the purpose of positioning. The proposed configuration allows multiplexing of multiple UEs within a transmission occasion as well as enjoy SRS transmit power control adapted for positioning purpose.

According to certain embodiments, a method performed by a user equipment (UE) includes obtaining a Sounding Reference Signal (SRS) configuration from a network node and determining and transmitting the SRS waveform. The SRS waveform is adapted for positioning based on the SRS configuration to have a full bandwidth within a bandwidth applicable or configured for the SRS waveform.

According to certain embodiments, a method performed by a base station includes transmitting an SRS configuration to a UE and receiving, from the UE, an SRS waveform adapted for positioning based on the SRS configuration. The SRS waveform has a full bandwidth within a bandwidth applicable or configured for the SRS waveform.

According to certain embodiments, a method performed by a UE includes performing a first power control method resulting in a first power control setting for a first SRS transmission in a first one or more time resources targeting reception by a first radio network node associated with at least one non-serving cell and performing a second power control method resulting in a second power control setting for a second SRS transmission in a second one or more time resources targeting reception at a second radio network node associated with a serving cell of the UE.

According to certain embodiments, a UE includes processing circuitry configured to obtain an SRS configuration from a network node, determine an SRS waveform that is adapted for positioning based on the SRS configuration, and transmit the SRS waveform. The SRS waveform has a full bandwidth within a bandwidth applicable for the SRS waveform.

According to certain embodiments, a base station including processing circuitry configured to transmit an SRS configuration to a UE and receive, from the UE, an SRS waveform adapted for positioning based on the SRS configuration. The SRS waveform has a full bandwidth within a bandwidth applicable or configured for the SRS waveform.

According to certain embodiments, a method performed by a UE includes obtaining an SRS configuration from a network node. Based on the SRS configuration, the UE performs a first power control method resulting in a first power control setting for a first SRS waveform that is adapted for positioning to have a full bandwidth within a first bandwidth applicable to the first SRS waveform and performs a second power control method resulting in a second power control setting for a second SRS waveform that may be adapted for positioning to have a full bandwidth within a second bandwidth applicable to the second SRS waveform. The UE transmits the first SRS waveform in a first one or more time resources targeting reception by a first radio network node associated with at least one non-serving cell and transmits the second SRS waveform in a second one or more time resources targeting reception at a second radio network node associated with the serving cell of the UE.

Certain embodiments may provide one or more of the following technical advantages. For example, one technical advantage may be that certain embodiments are more immune to multipath fading. As another example, one technical advantage may be that certain embodiments provide more reliable results, which may improve the positioning accuracy based on uplink measurements.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
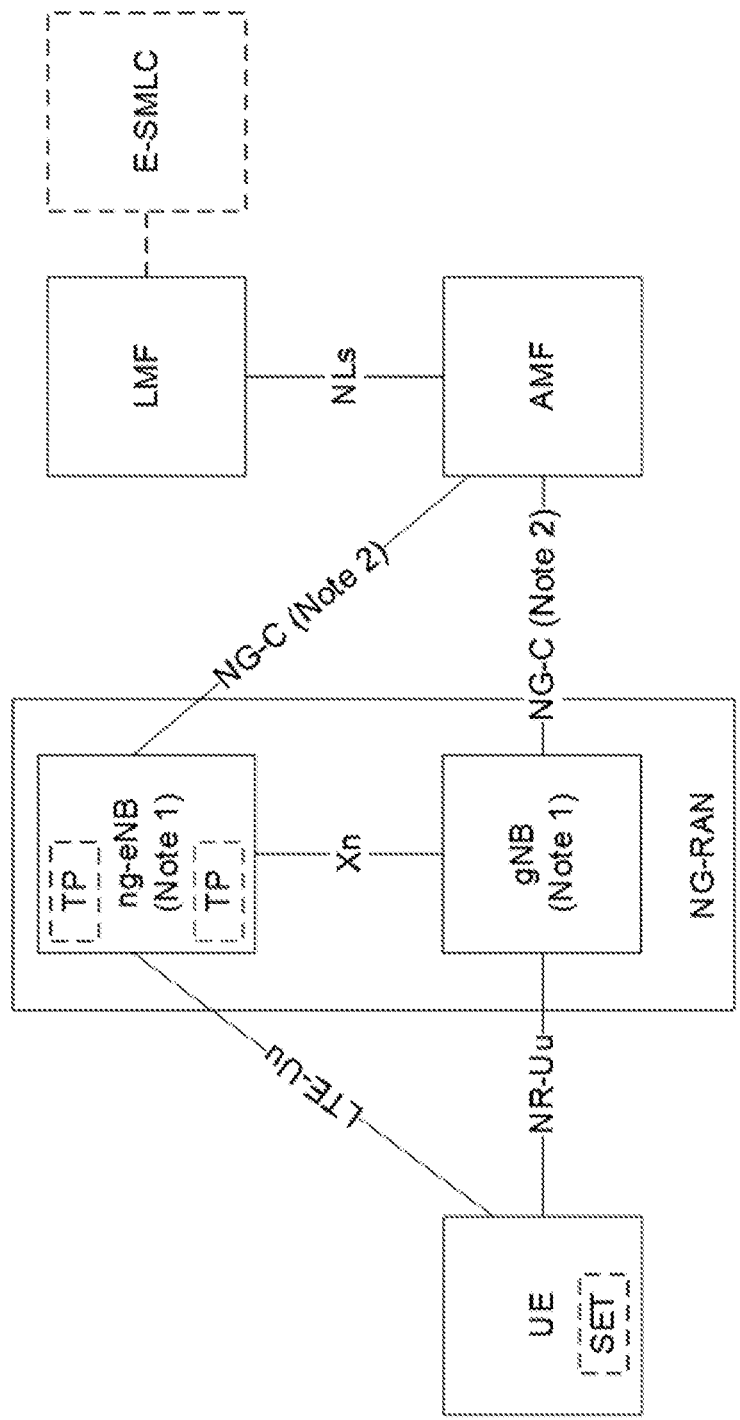
FIG. 1 illustrates Next Generation Radio Access Network (NG-RAN) Release 15 Location Services (LCS) protocols.
Figure 2:
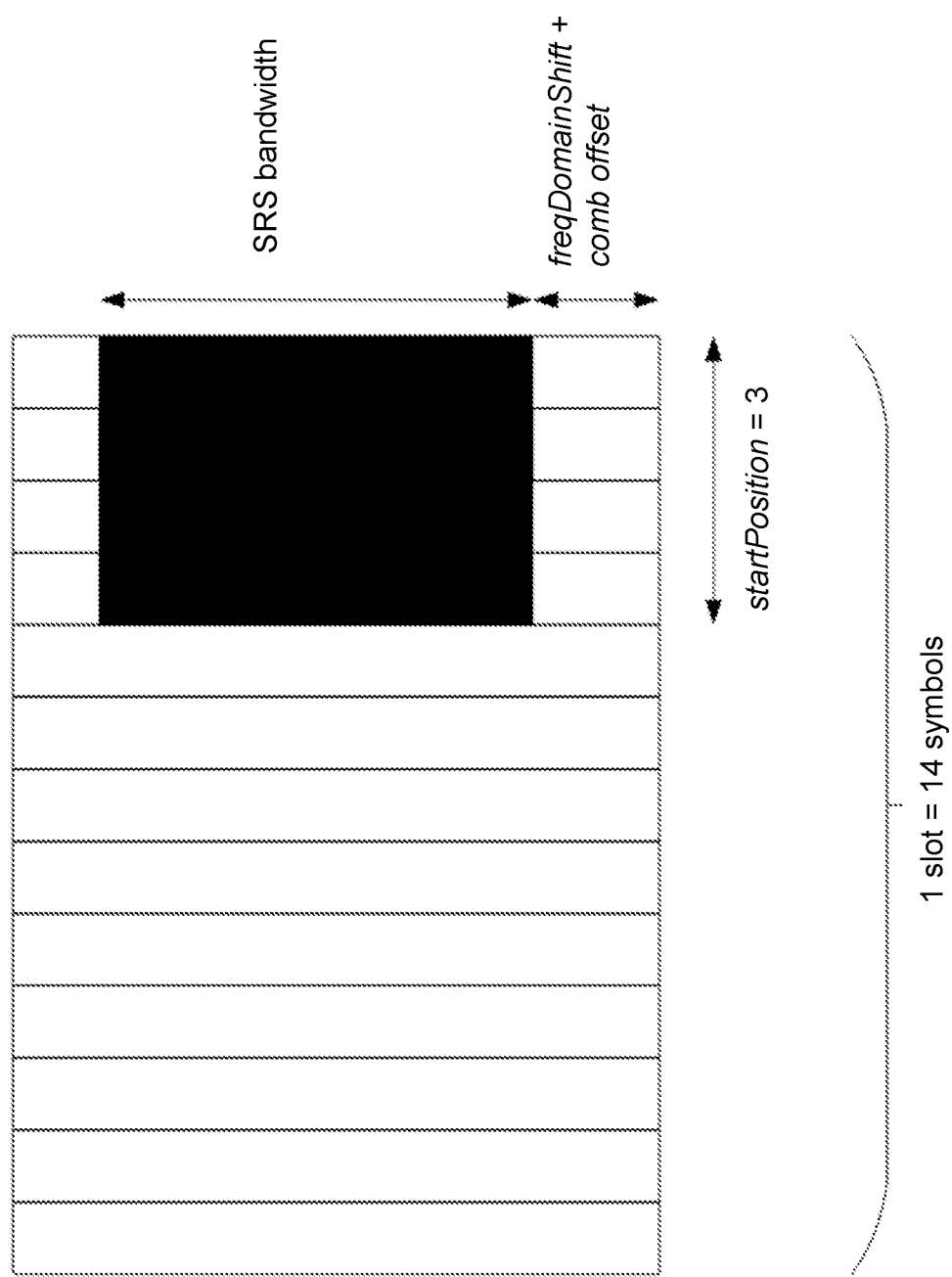
FIG. 2 illustrates an example time resource allocation.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term "network node" may be used and may correspond to any type of radio network node or any network node, which communicates with a UE (directly or via another node) and/or with another network node. Examples of network nodes are NodeB, MeNB, ENB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc), O&M, OSS, SON, positioning node (e.g. E-SMLC), MDT, test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, UE category M1, UE category M2, ProSe UE, V2V UE, V2X UE, etc.

Additionally, terminologies such as base station/gNodeB and UE should be considered non-limiting and do in particular not imply a certain hierarchical relation between the two; in general, "gNodeB" could be considered as device 1 and "UE" could be considered as device 2 and these two devices communicate with each other over some radio channel. And in the following the transmitter or receiver could be either gNB, or UE.

According to certain embodiments, an SRS based positioning solution is proposed, which uses SRS to enable UL positioning. The configuration and the architecture are described in the respective sections below.

The term full bandwidth as used herein can mean:
i) continuous SRS transmission in frequency—i.e. that all subcarriers within the bandwidth applicable for, or configured for, SRS are used in at least one of the SRS symbols;
ii) dense SRS transmission (minimizing the number of subcarriers unused for SRS within a symbol) within the bandwidth applicable for, or configured for, SRS—i.e. that the number of subcarriers within the bandwidth applicable for or configured for SRS that are not used in at least one of the SRS symbols is minimized.

Configuration for Estimation of UE Position Based on the Bandwidth Required for Positioning For the best accuracy, it is desirable to have full bandwidth of the transmitted signal. That is to say, the time of arrival (TOA) estimation is done using every subcarrier in the Orthogonal Frequency Division Multiplexing (OFDM) symbol in all physical resource blocks (PRBs) allowed for the transmission. This avoids the creation of sidelobes in the correlation function which limits the range over which one can do a time estimate based on the correlation function.

One way to achieve full bandwidth is to transmit a full bandwidth Sounding Reference Signal (SRS) in an OFDM symbol. However, the 3GPP specification limits the density of SRS to a comb of factor 2 or 4. Meaning that at least half if not three quarter of the symbols are left empty. This means the time of arrival range is limited to Tu/4 or Tu/2, where Tu is the symbol duration. According to a particular embodiment, the term full bandwidth may comprise continuous in frequency or dense (minimizing the number of subcarriers unused, i.e. not used, for SRS within a symbol) SRS transmissions within the bandwidth applicable for SRS. The bandwidth applicable for SRS may be a set of PRBs in which SRS can be transmitted for non-positioning purpose in the same or different subframes, e.g., with frequency hopping.

According to a further embodiment, the full bandwidth may further comprise the minimum of at least of: one of configurable or the maximum UE-supported transmission bandwidth (BW), one of configurable or the maximum transmission point (TP) supported reception bandwidth, cell uplink (UL) bandwidth, the size of the active Bandwidth Part (BWP) in which the SRS are to be transmitted, one of the pre-defined bandwidths specified for positioning purpose. That is, in one example, the UE may increase its transmission bandwidth for positioning purposes up to the maximum UE supported transmission bandwidth, even if its transmissions to the serving cell for non-positioning communication are over a smaller bandwidth.

Figure 3:
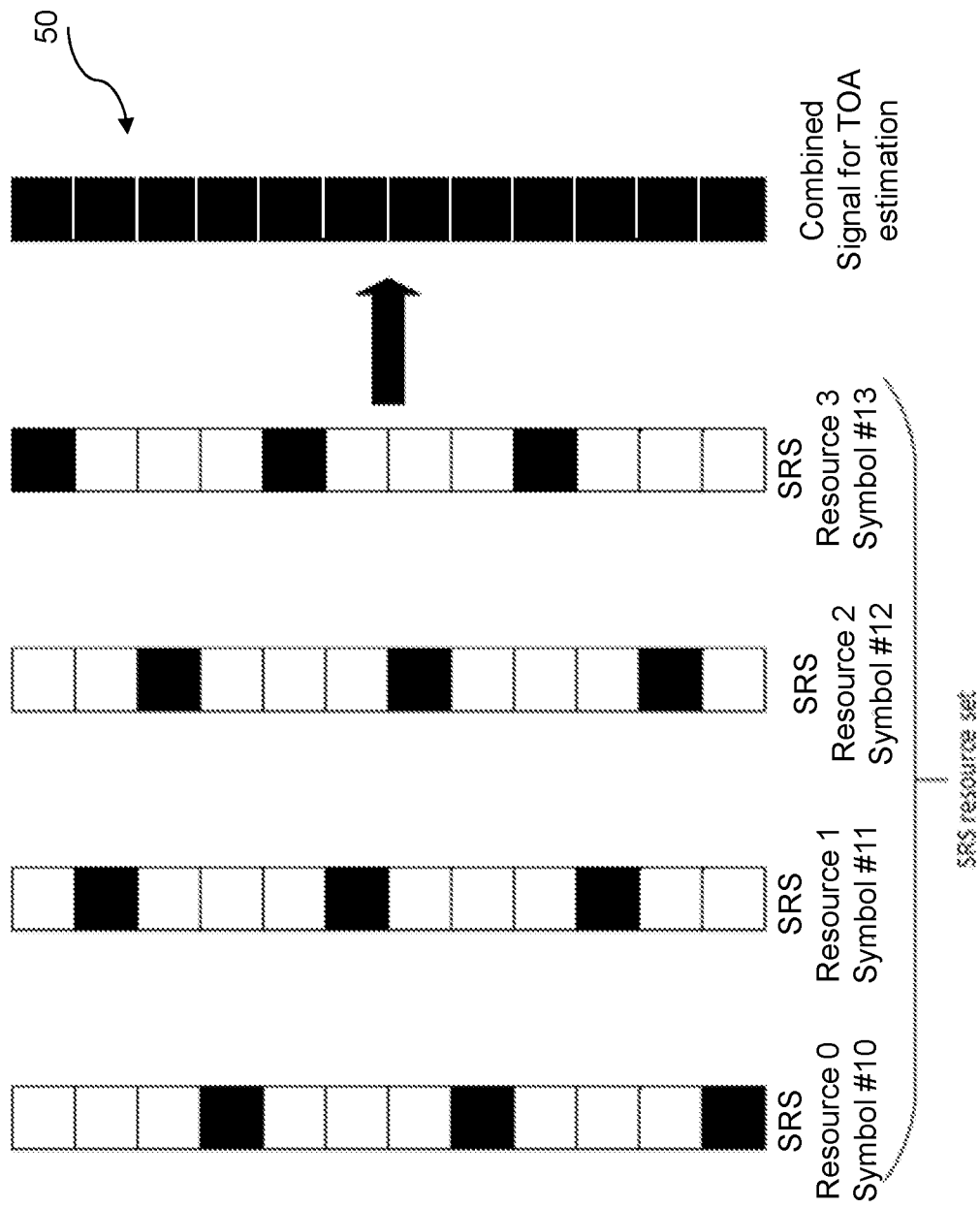
FIG. 3 illustrates concatenation of four comb 4 SRS symbols to obtain full bandwidth, according to certain embodiments.

FIG. 3 is a block diagram 50 illustrating concatenation of four comb 4 SRS symbols to obtain full bandwidth, according to certain embodiments. According to a particular embodiment, the full bandwidth is achieved by concatenation of two comb-2 SRS symbols or four comb-4 SRS symbol, respectively, so that the time of arrival is estimated based on the accumulation instead of the SRS symbol, as illustrated in FIG. 3. The configuration achieving this for 5G NR is to configure two (or four, respectively) SRS resources in a single SRS resource set, with each resource setup with a different comb offset (controlled by the semi static parameter combOffset-n4 for a transmission comb of four or combOffset-n2 for a transmission comb of two). As used herein, the term SRS resource may be interpreted as either a 'SRS-Resource' as defined by the NR RRC information element 'SRS-Resource' or as one symbol of an 'SRS-Resource' as defined by the NR RRC Resource information element 'SRS Resource'.

In yet another embodiment, the transmit power for SRS configured positioning for positioning is adapted for positioning purpose, differently from power-controlled SRS towards the serving cell for other purposes. In one example, a pre-defined amount of power is configured for SRS, e.g., maximum transmit UE power or a pre-defined portion from the maximum transmit UE power is allocated to SRS (at least in the direction different from the serving cell transmitted), regardless of the pathloss with the serving cell.

In another embodiment, when the SRS positioning configuration is composed of two or more SRS configurations, the component SRS configurations can be reused without explicitly signaling the combined SRS configuration (e.g., to reduce signaling overhead) but a separate power control is applied for the combined SRS configuration, in addition to the power control for the component configurations. Such power control may be based on a predefined rule (e.g., X dB different, where X dB may be positive or negative, with respect to a reference component SRS configuration) or may be implemented by means of a separate power control loop.

Additional performance gain can be obtained by utilizing the power allocated to the empty carriers into the occupied carrier. This is referred to as power boosting. The available amount of power boosting is equal to the comb size, i.e. 3 dB for comb 2 and 6 dB for comb 4. In another embodiment, the transmission of SRS for the purpose of positioning is done on power boosted symbols.

Figure 4:
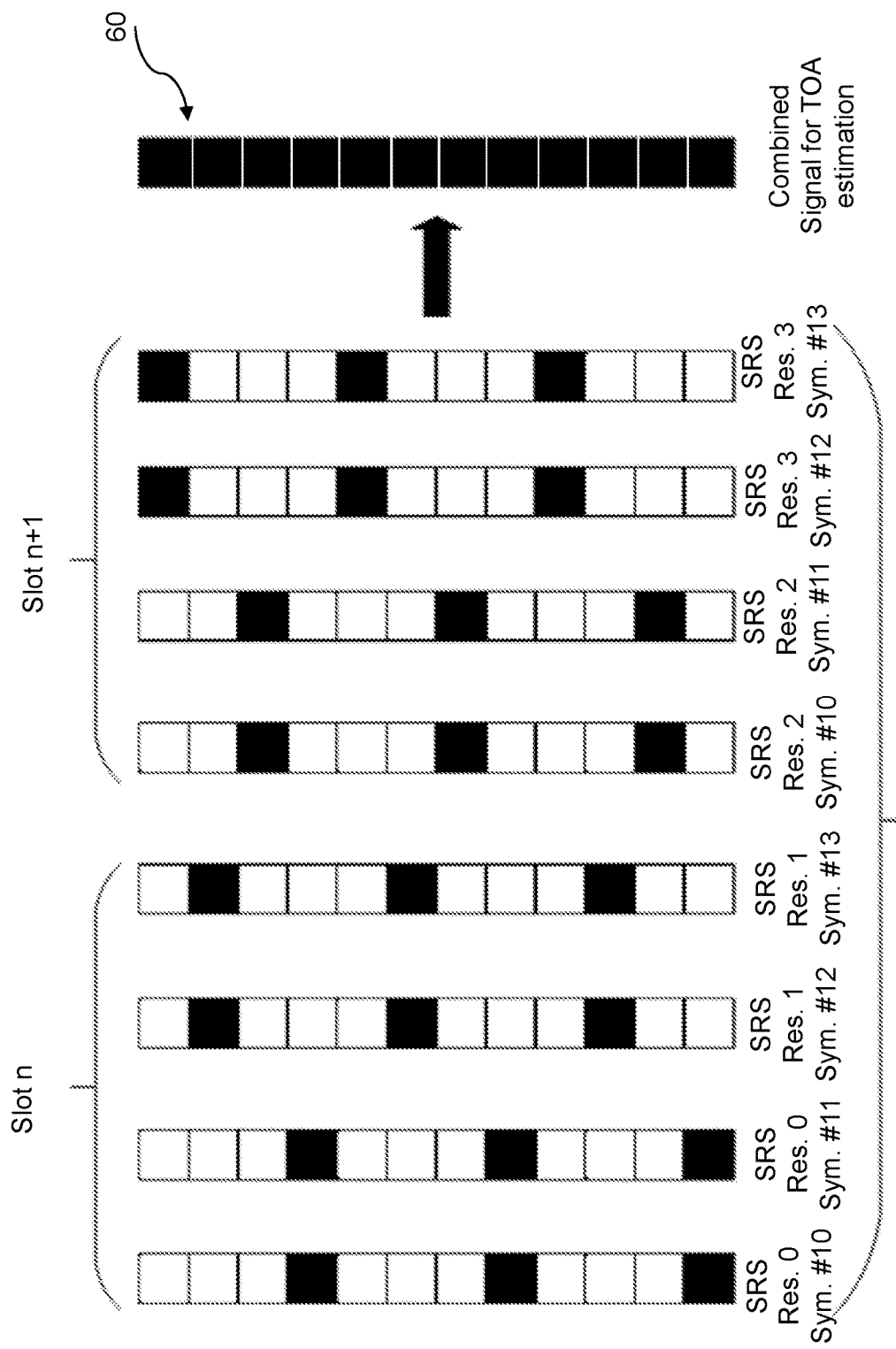
FIG. 4 illustrates concatenation with repetition factor 2, according to certain embodiments.

Another way to add power and therefore noise resistance is to transmit a repetition of symbols of the same comb and comb offset as shown in FIG. 4. Specifically, FIG. 4 is a block diagram 60 illustrating concatenation with repetition factor 2. In 5G NR, this is controlled by configuring the parameter repetitionFactor to a value of 1 (no repetition), 2 or 4. In yet another embodiment, the transmission of SRS for the purpose of positioning is done with symbol repetition.

In yet another embodiment, frequency hopping is used. Frequency hopping is an important feature that allows bandwidth limited UEs to achieve full bandwidth by transmitting portion of the bandwidth in different symbols.

Figure 5:
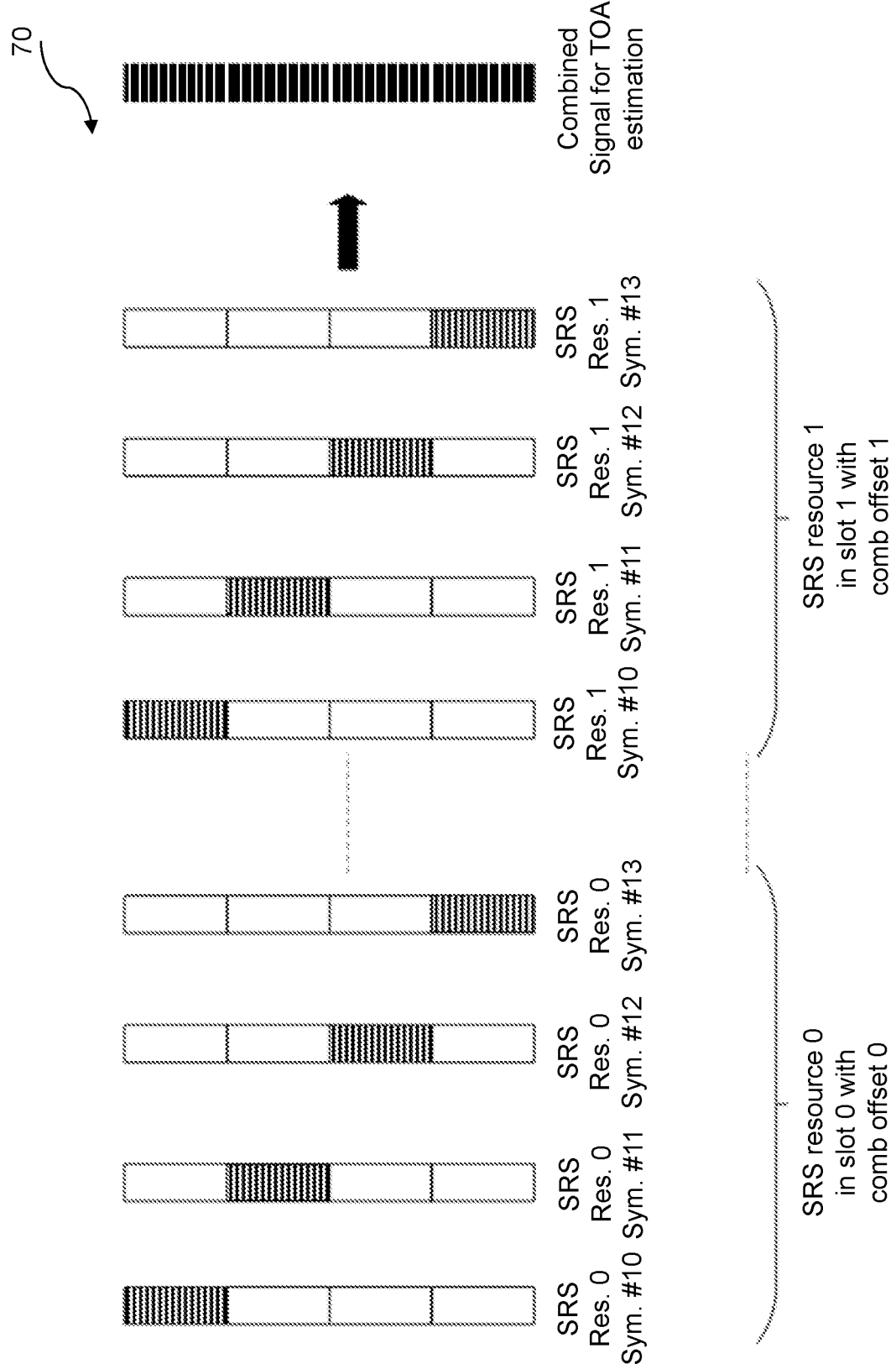
FIG. 5 illustrates an example of the combined used of frequency hopping and comb offsets configurations to obtain the full bandwidth signal; according to certain embodiments.

FIG. 5 is a block diagram 70 illustrating an example of the combined used of frequency hopping and comb offsets configurations to obtain the full bandwidth signal, according to certain embodiments. Frequency hopping is configured in the semi-static parameter set freqHopping.

In yet another embodiment a combination of the aforementioned methods (power boosting, concatenation, repetition, frequency hopping) is done to improve the positioning. As an example, the signal can be power boosted, repeated over multiple symbols, use comb offsets and frequency hopping in the same solution to maximize orthogonal resources.

The SRS configuration for positioning purpose achieved by a combination of two or more configurations may be defined and/or signaled between UE and/or network nodes as one (resulting) configuration, in one example. In another example, two or more components comprising the combination may be defined and/or signaled separately in the same or even different messages; the combining of the components to get the combined SRS configuration for positioning may be then done in the transmitting node and/or receiving node.

In a particular embodiment, different variants of SRS can be transmitted from different antennas of UE transmitter. While at the BS receiver these different SRS versions can be combined to create a combined signal occupying all resource elements.

In a particular embodiment, different variants of SRS can be transmitted in different beams.

According to certain embodiments, structure of SRS for positioning can be adapted based on the positioning technology used. For example, the SRS used in Round-Trip-Time (RTT) based positioning can be different than the SRS used in UTDOA based positioning. RTT procedure would benefit if resource elements in SRS are allocated in beginning of the slot.

Accordingly, some example embodiments may be provided as follows:

A UE is configured with four comb-n SRS resources i=0, 1, . . . , n, where n is 2 or 4. Each of the n SRS resources are with a different subcarrier shift modulo (i+b, n) where b can be 0, 1, . . . , n, b can be different for different UE's in the network.

In one embodiment-variant n=4 and the four comb-4 SRS resources are of length one symbol and are configured to be transmitted in the same slot.

In one embodiment-variant n=2 and the two comb-2 SRS resources are of length two symbols and are configured to be transmitted in the same slot.

In one embodiment-variant n=4 and the four comb-4 SRS resources are of length four symbols and are configured to be transmitted in four different slots. In one embodiment-variant these slots are consecutive.

In one embodiment-variant the SRS no group or frequency hopping is configured.

In one embodiment-variant the SRS is configured with frequency hopping.

Architecture and Protocol Impact

The NR positioning protocol is used to communicate assistance data to the network elements involved in the positioning operation. Example steps taken by the higher layer protocols to configure the solution are described below.

The SRS configuration for positioning purpose achieved by a combination of two or more configurations may be defined and/or signaled between UE and/or network nodes as one (resulting) configuration, in one example embodiment. In another example embodiment, two or more components comprising the combination may be defined and/or signaled separately in the same or even different messages. The combining of the components to get the combined SRS configuration for positioning may be then done in the transmitting node and/or receiving node. For the reception of SRS, a network node may be a node controlling a Location Measurement Unit (LMU) or a base station co-located with LMU.

Figure 6:
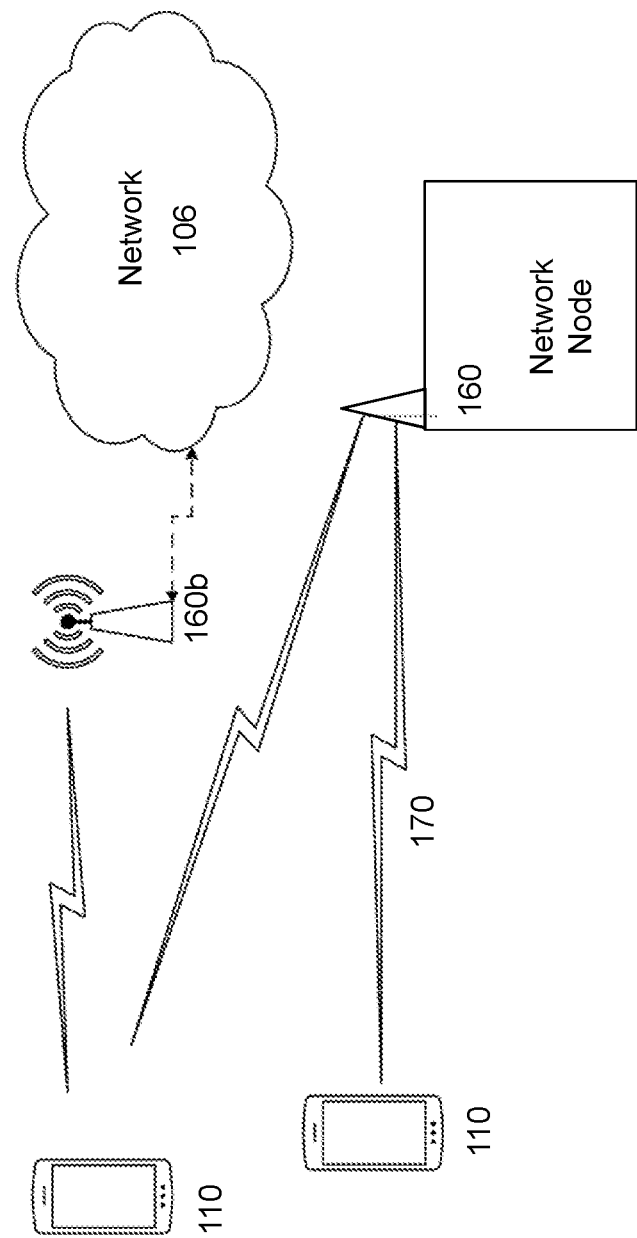
FIG. 6 illustrates an example wireless network, according to certain embodiments.

FIG. 6 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 106, network nodes 160 and 160b, and wireless devices 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system.

In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 7:
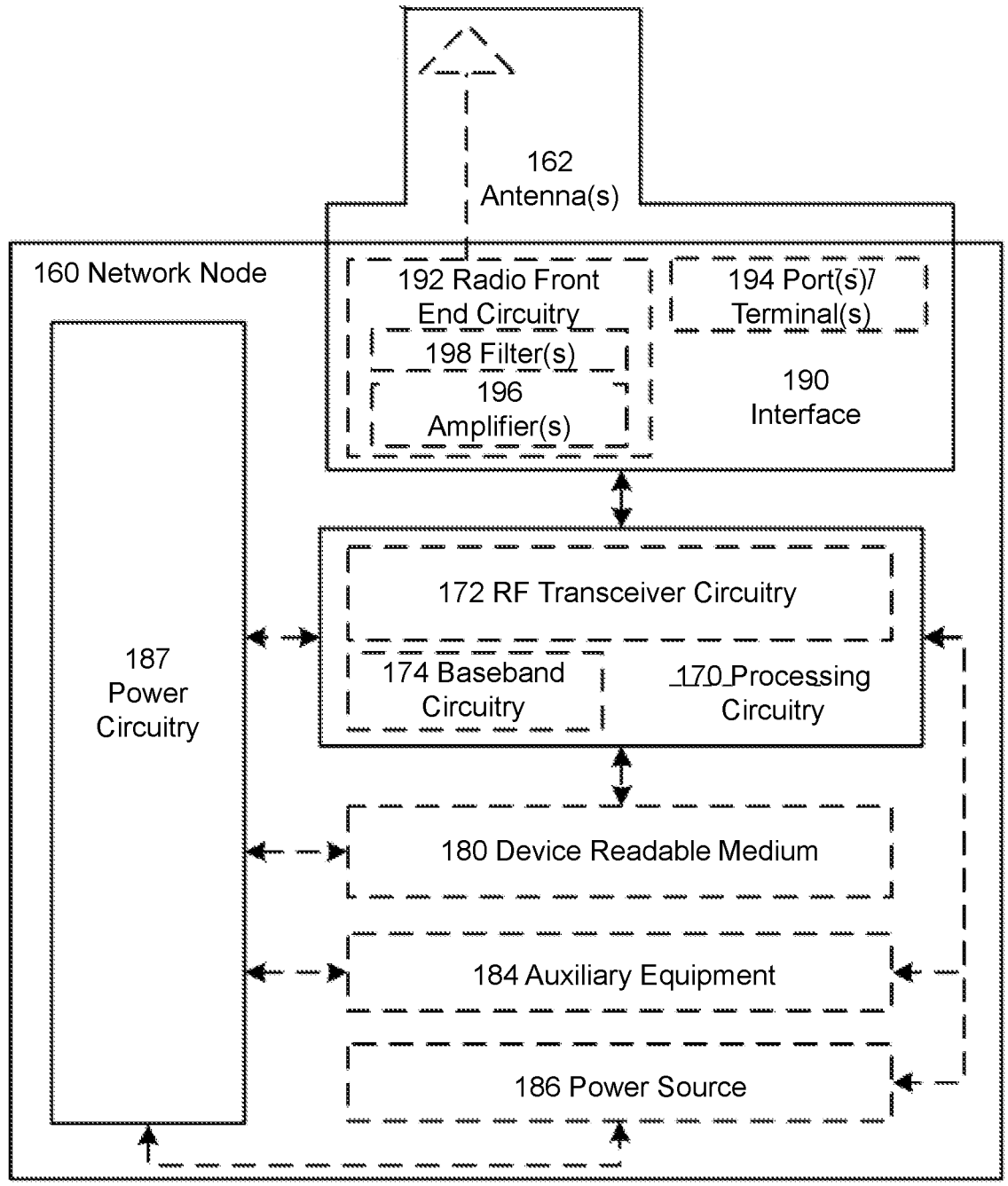
FIG. 7 illustrates an example network node, according to certain embodiments.

FIG. 7 illustrates an example network, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 160 includes processing circuitry 170, device readable medium 180, interface 190, auxiliary equipment 184, power source 186, power circuitry 187, and antenna 162. Although network node 160 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 7 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 8:
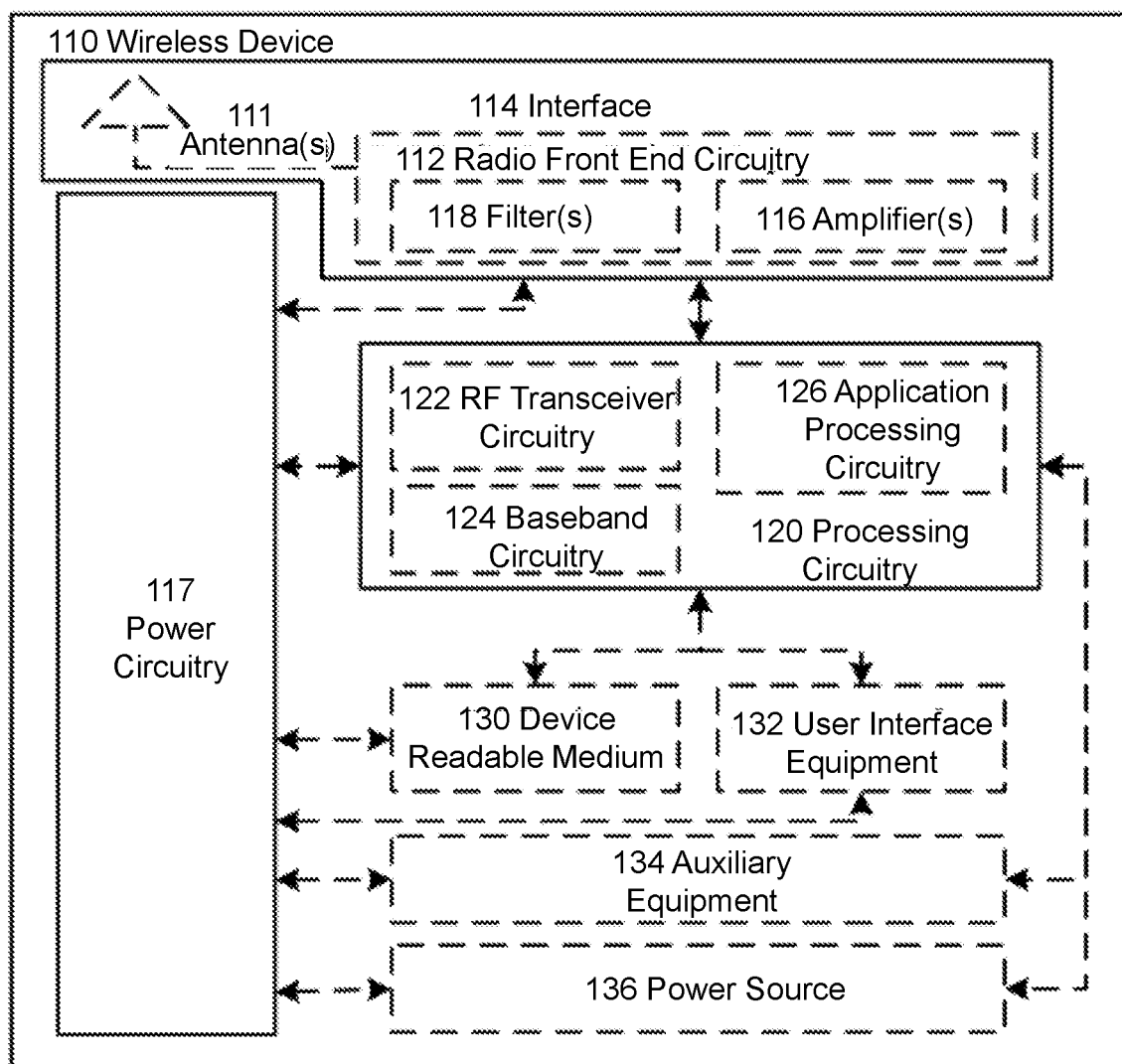
FIG. 8 illustrates an example wireless device, according to certain embodiments.

FIG. 8 illustrates an example wireless device 110, according to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hardwired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. Wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 9:
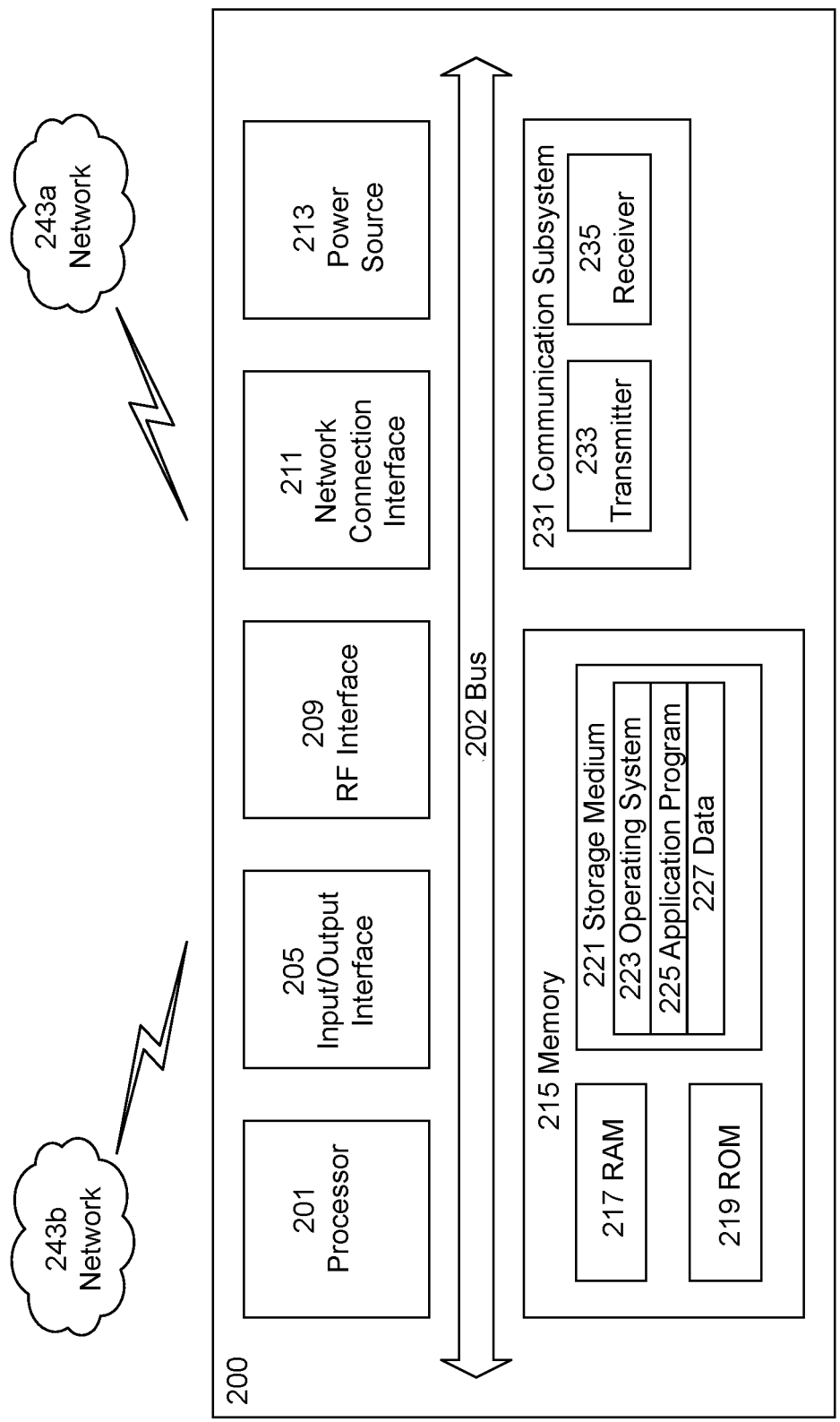
FIG. 9 illustrate an example user equipment, according to certain embodiments.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 9, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 9, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 10:
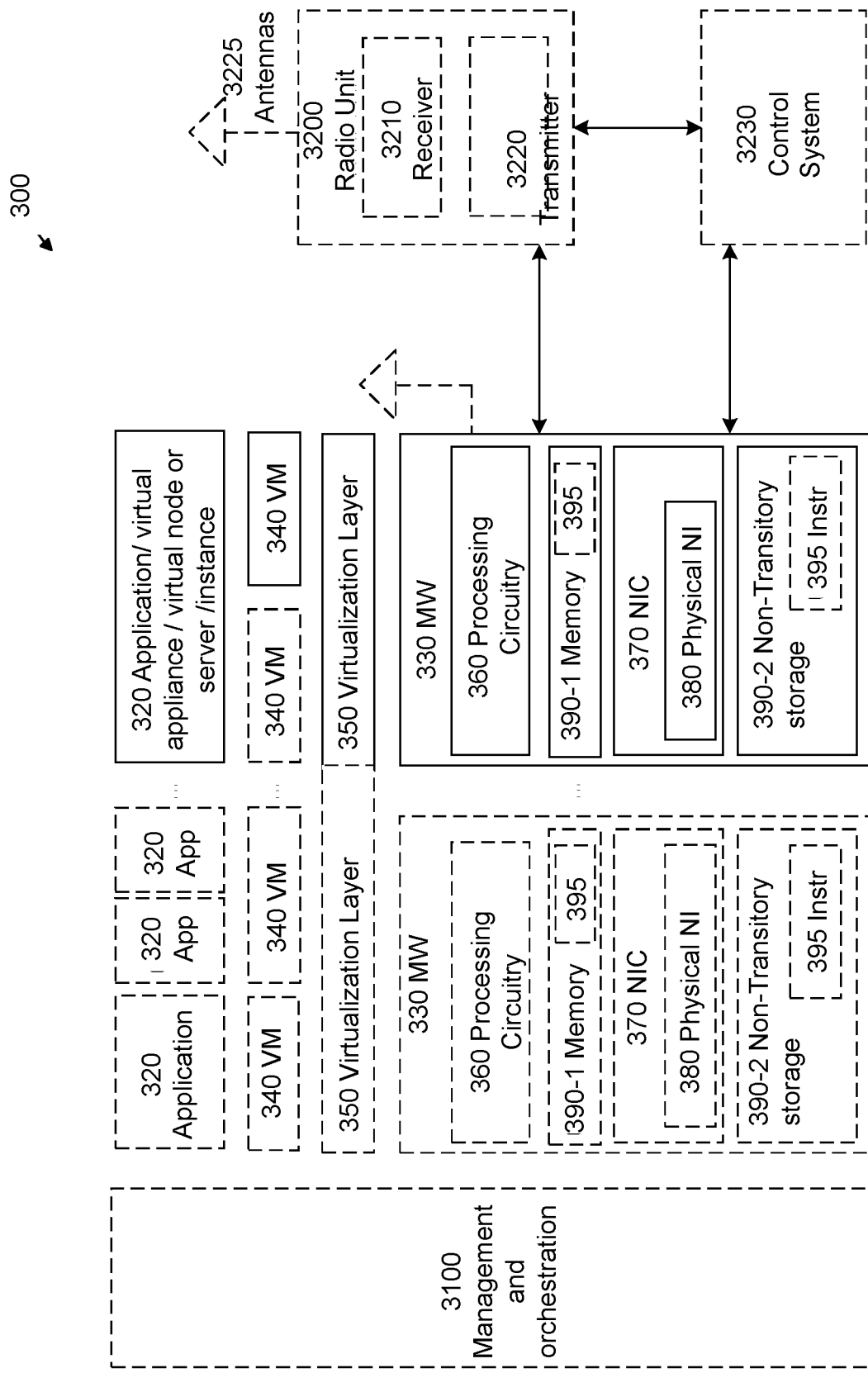
FIG. 10 illustrates a virtualization environment in which functions implemented by some embodiments may be virtualized, according to certain embodiments.

FIG. 10 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 10, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 10.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be affected with the use of control system 3230 which may alternatively be used for communication between the hardware nodes 330 and radio units 3200.

Figure 11:
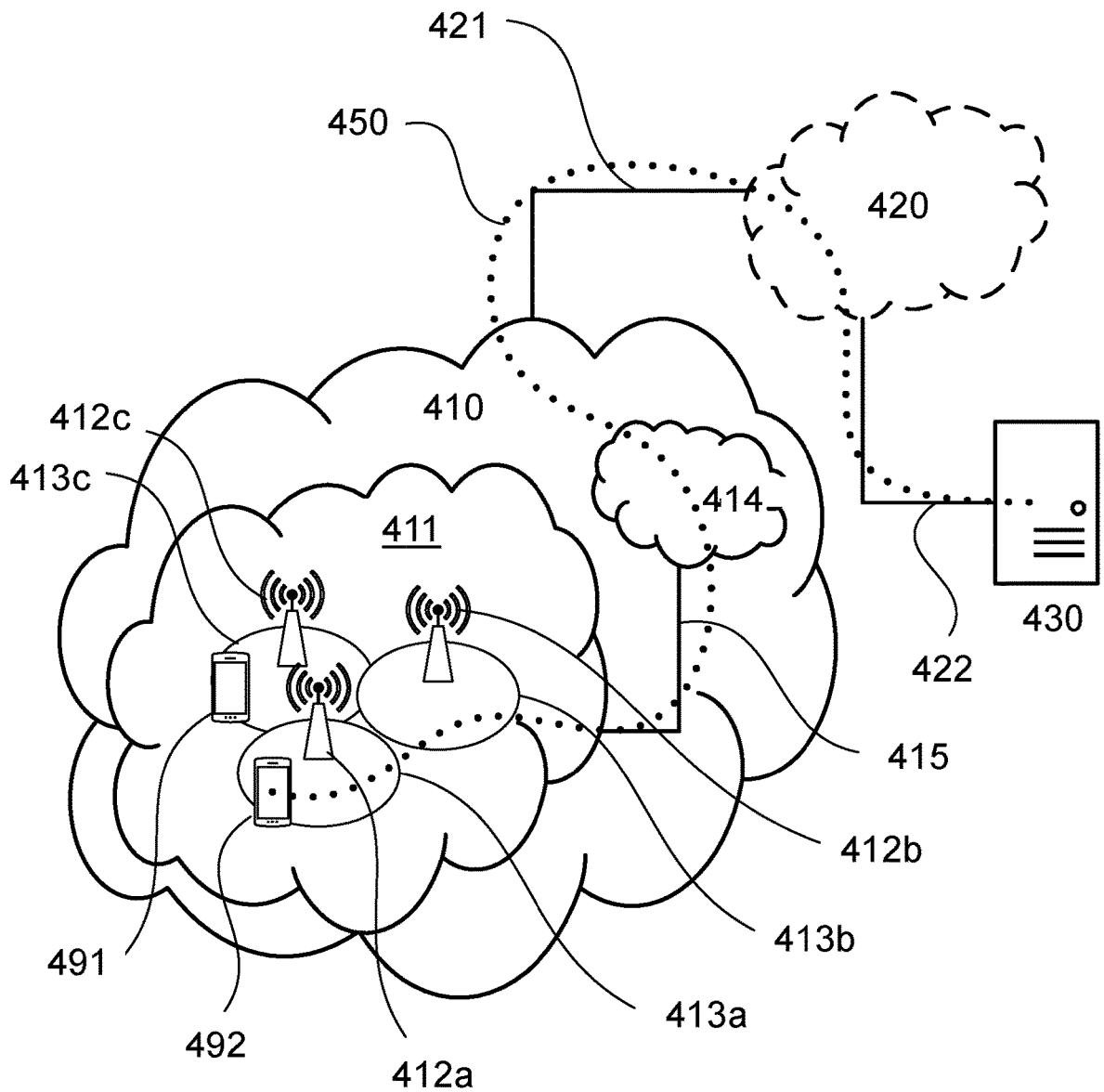
FIG. 11 illustrates a telecommunication network connected via an intermediate network to a host computer, according to certain embodiments.

FIG. 11 illustrates a telecommunication network connected via an intermediate network to a host computer in accordance with some embodiments.

With reference to FIG. 11, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 11 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 12:
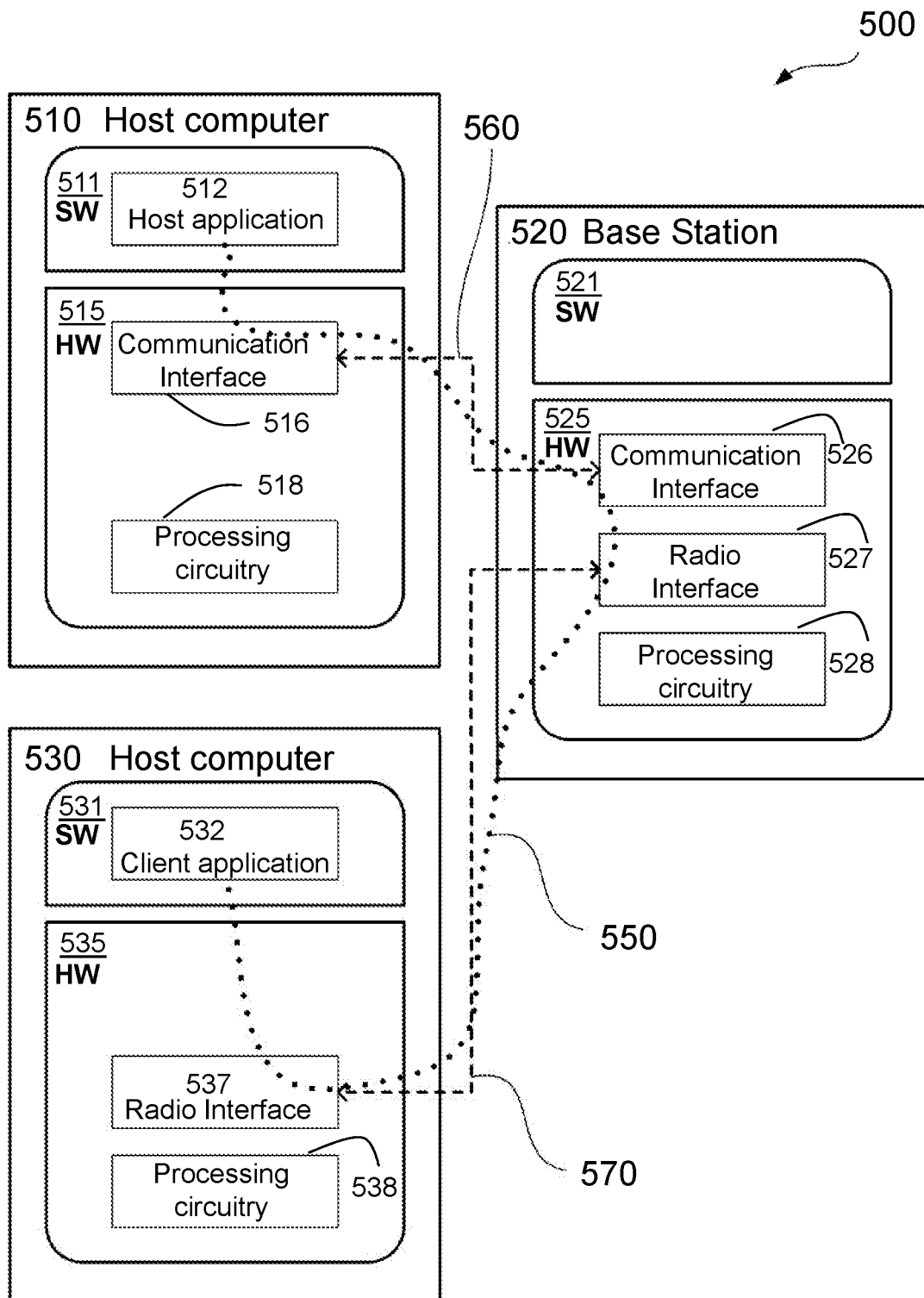
FIG. 12 illustrates a generalized block diagram of a host computer communicating via a base station with a user equipment over a partially wireless connection, according to certain embodiments.

FIG. 12 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 12. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 12) served by base station 520. Communication interface 526 may be configured to facilitate connection 560 to host computer 510. Connection 560 may be direct or it may pass through a core network (not shown in FIG. 12) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 12 may be similar or identical to host computer 430, one of base stations 412a, 412b, 412c and one of UEs 491, 492 of FIG. 11, respectively. This is to say, the inner workings of these entities may be as shown in FIG. 12 and independently, the surrounding network topology may be that of FIG. 11.

In FIG. 12, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 13, 14:
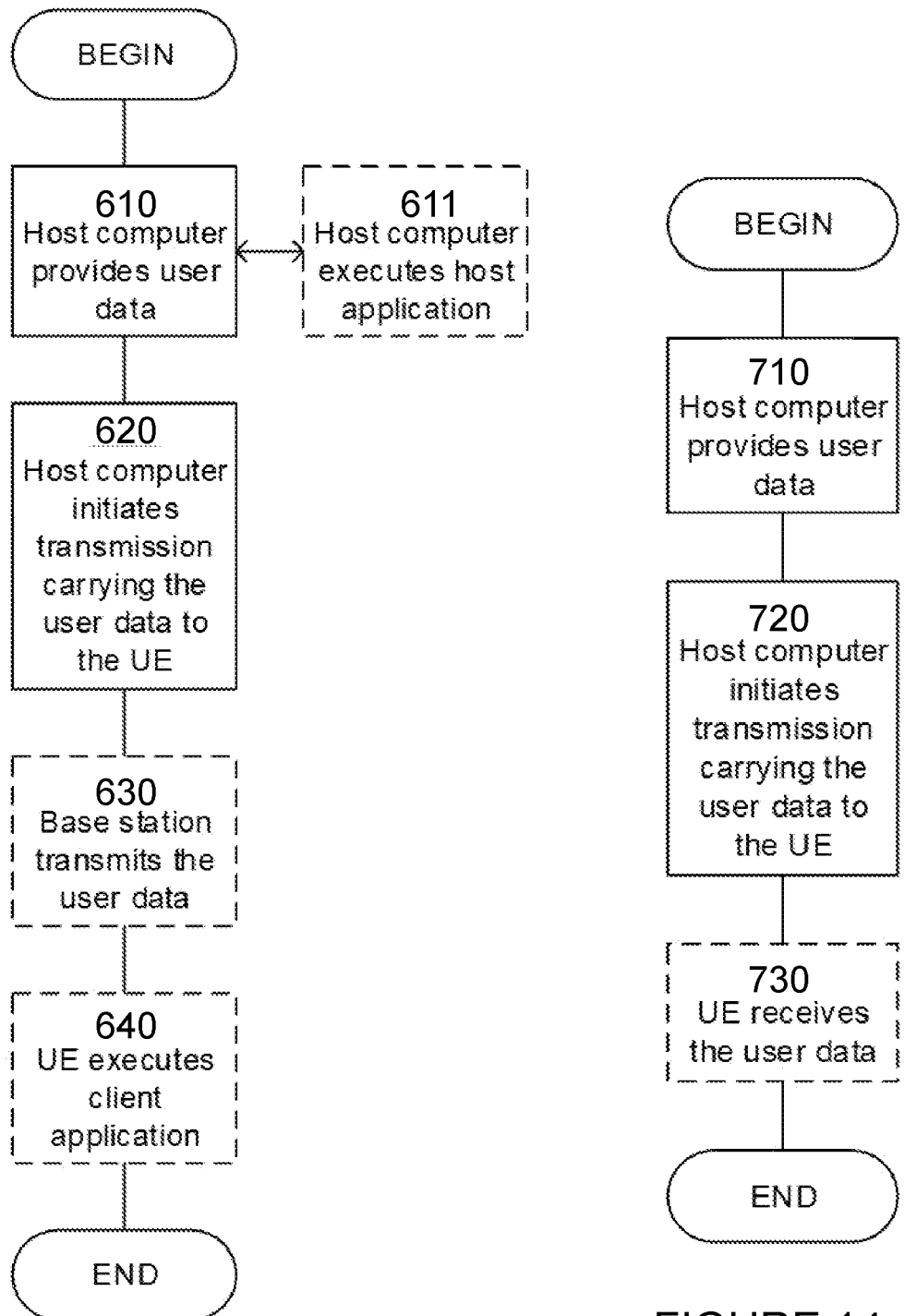
FIG. 13 illustrates a method implemented in a communication system, according to one embodiment.
FIG. 14 illustrates another method implemented in a communication system, according to one embodiment.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 15, 16:
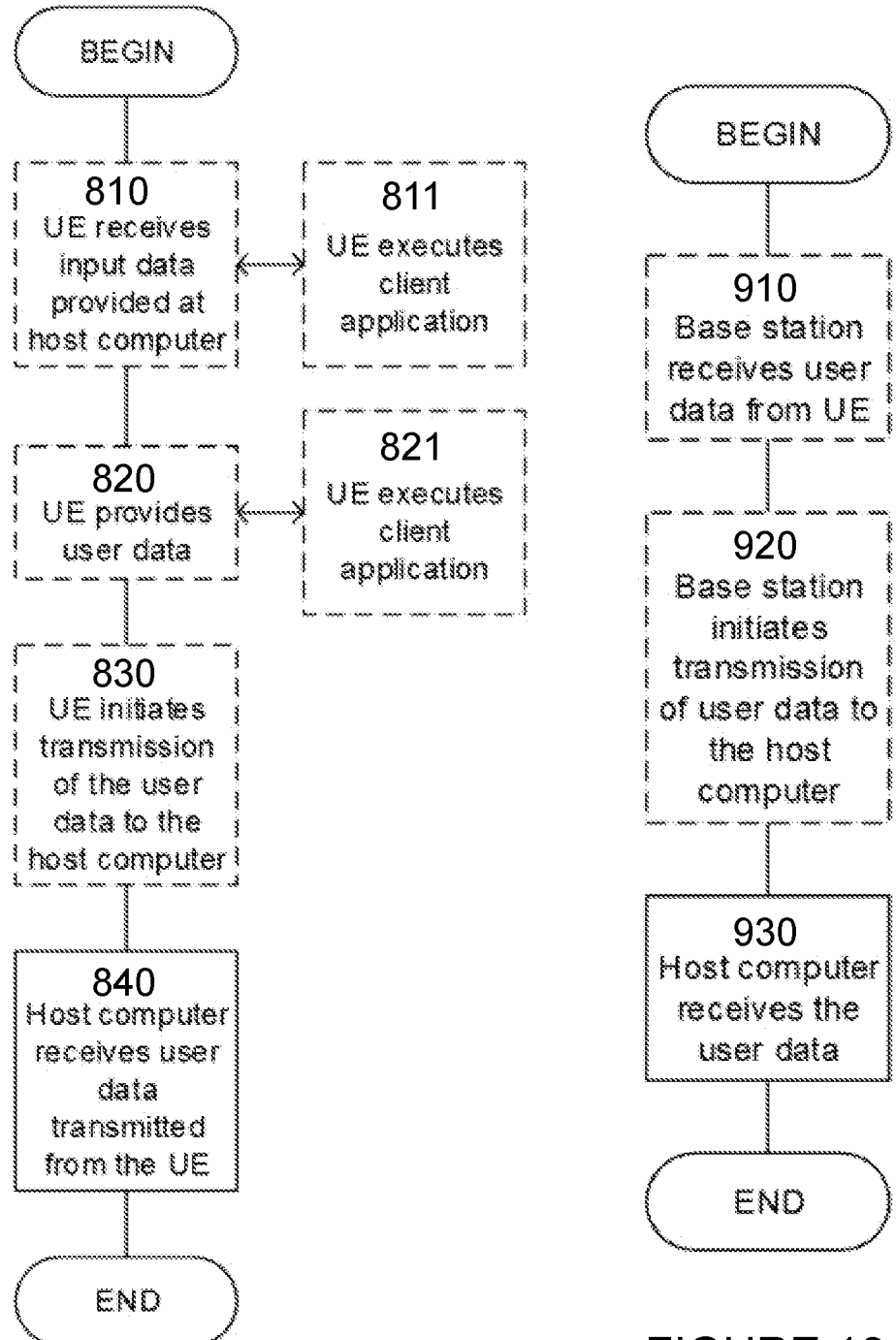
FIG. 15 illustrates a third method implemented in a communication system, according to one embodiment.
FIG. 16 illustrates a fourth method implemented in a communication system, according to one embodiment.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 17:
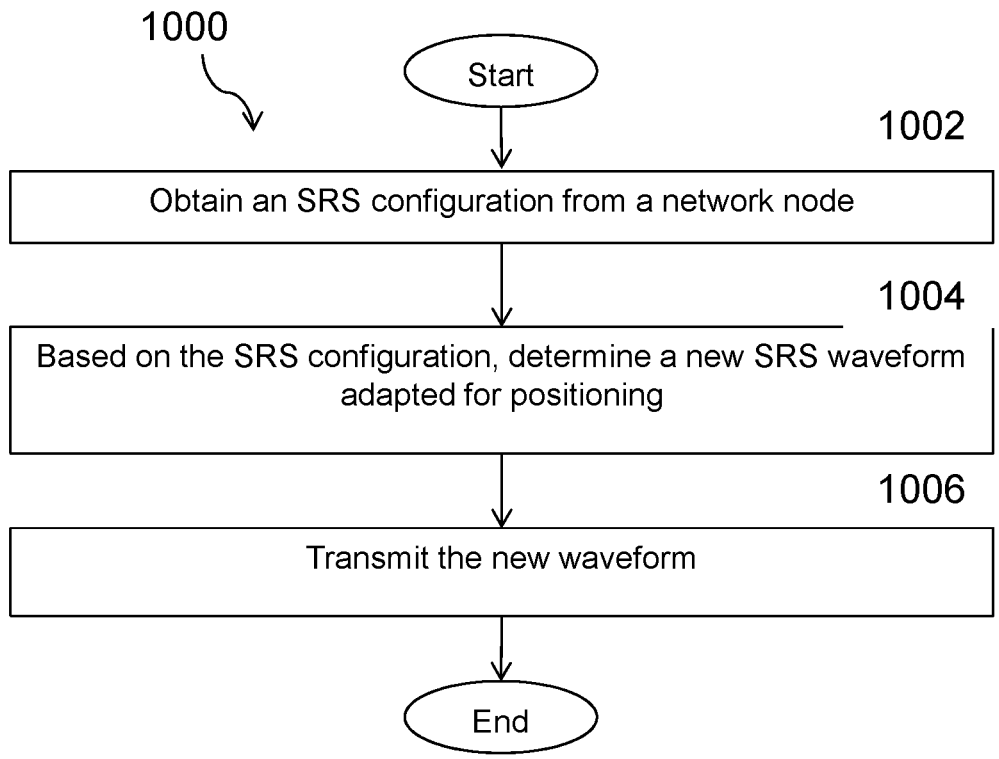
FIG. 17 illustrates an example method by a wireless device, according to certain embodiments.

FIG. 17 depicts a method 1000 by a wireless device, according to certain embodiments. In a particular embodiment, the wireless device may include a UE. At step 1002, the wireless device obtains an SRS configuration from a network node. At step 1004, the wireless device determines a new SRS waveform that is adapted for positioning based on the SRS configuration. At step 1006, the new SRS waveform is transmitted.

Figure 18:
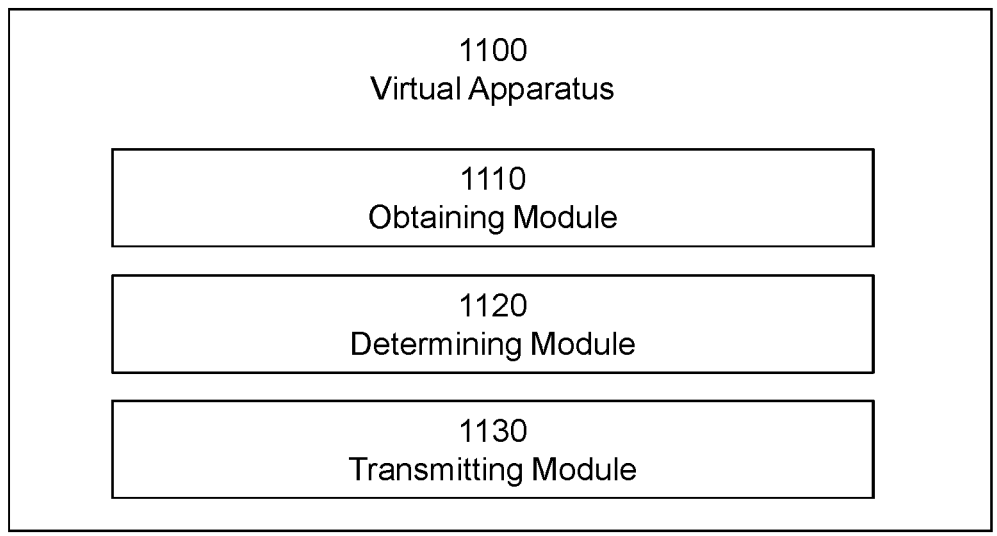
FIG. 18 illustrates an exemplary virtual computing device, according to certain embodiments.

FIG. 18 illustrates a schematic block diagram of a virtual apparatus 1100 in a wireless network (for example, the wireless network shown in FIG. 6). The apparatus may be implemented in a wireless device or network node (e.g., wireless device 110 or network node 160 shown in FIG. 6). Apparatus 1100 is operable to carry out the example method described with reference to FIG. 17 and possibly any other processes or methods disclosed herein. It is also to be understood that the method of FIG. 17 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining module 1110, determining module 1120, transmitting module 1130, and any other suitable units of apparatus 1100 to perform corresponding functions according one or more embodiments of the present disclosure.

According to certain embodiments, obtaining module 1110 may perform certain of the obtaining functions of the apparatus 1100. For example, obtaining module 1110 may obtain an SRS configuration from a network node.

According to certain embodiments, determining module 1120 may perform certain of the determining functions of the apparatus 1100. For example, determining module 1120 may determine a new SRS waveform that is adapted for positioning based on the SRS configuration.

According to certain embodiments, transmitting module 1130 may perform certain of the determining functions of the apparatus 1100. For example, transmitting module 1130 may transmit the new SRS waveform.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 19:
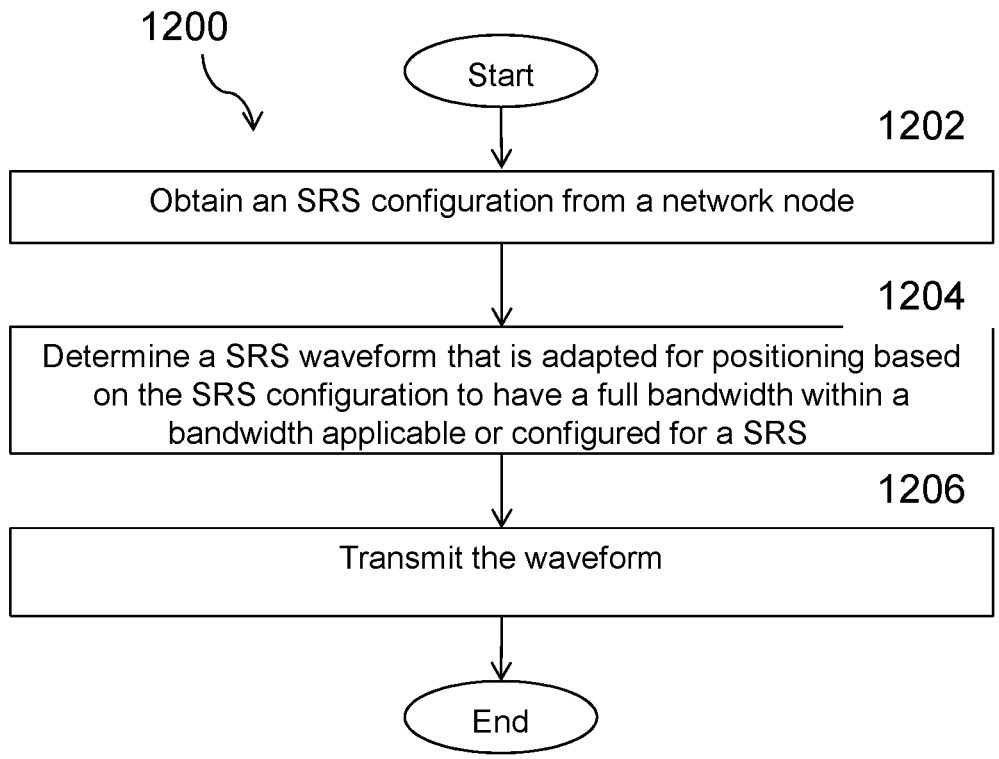
FIG. 19 illustrates an example method performed by a user equipment (UE), according to certain embodiments.

FIG. 19 depicts a method 1200 performed by a UE 200, according to certain embodiments. At step 1202, the UE 200 obtains an SRS configuration from a network node 160. At step 1204, the UE 200 determines an SRS waveform that is adapted for positioning based on the SRS configuration to have a full bandwidth within a bandwidth applicable or configured for the SRS waveform. At step 1206, the UE 200 transmits the SRS waveform.

In a particular embodiment, the SRS waveform uses, for a comb-n SRS resource, every subcarrier in a combination of n OFDM symbols in all PRBs applicable for the SRS waveform.

In a particular embodiment, the UE is configured with n comb-n SRS resources, indexed i=0, 1, . . . , n−1, and n is 2 or 4. Each of the n resources is with a different subcarrier shift modulo (i+b, n) where b is 0, 1, . . . , n−1. In a further particular embodiment, each of the n comb-n SRS resources has a duration of one SRS symbol. In a further particular embodiment, n=4 and the four comb-4 SRS resources are of a length of one symbol and are configured to be transmitted in the same slot. In yet another particular embodiment, n=2 and the two comb-2 SRS resources are of a length of two symbols and are configured to be transmitted in the same slot. In still another particular embodiment, n=4 and the four comb-4 SRS resources are of a length of four symbols and are configured to be transmitted in four different slots. In a further particular embodiment, one or more of the symbols disclosed herein may include one or more OFDM symbols.

In a particular embodiment, no group or frequency hopping is configured for the SRS waveform.

In a particular embodiment, frequency hopping is configured for the SRS waveform.

Figure 20:
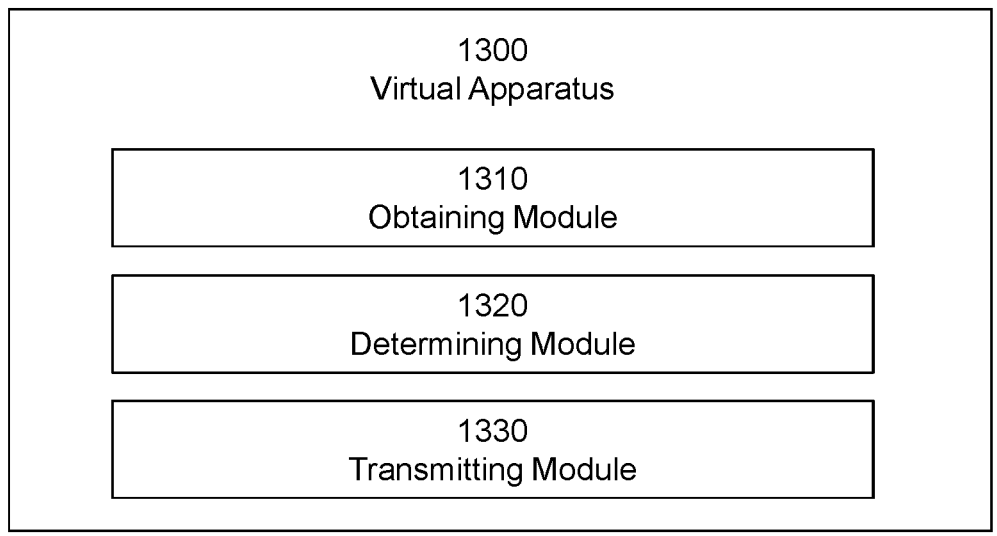
FIG. 20 illustrates another exemplary virtual computing device, according to certain embodiments.

FIG. 20 illustrates a schematic block diagram of a virtual apparatus 1300 in a wireless network (for example, the wireless network shown in FIG. 6). The apparatus may be implemented in a wireless device or network node (e.g., wireless device 110 or network node 160 shown in FIG. 6). Apparatus 1300 is operable to carry out the example method described with reference to FIG. 19 and possibly any other processes or methods disclosed herein. It is also to be understood that the method of FIG. 19 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining module 1310, determining module 1320, transmitting module 1330, and any other suitable units of apparatus 1300 to perform corresponding functions according one or more embodiments of the present disclosure.

According to certain embodiments, obtaining module 1310 may perform certain of the obtaining functions of the apparatus 1300. For example, obtaining module 1310 may obtain an SRS configuration from a network node 160.

According to certain embodiments, determining module 1320 may perform certain of the determining functions of the apparatus 1300. For example, determining module 1320 may determine an SRS waveform that is adapted for positioning based on the SRS configuration to have a full bandwidth within a bandwidth applicable or configured for the SRS waveform.

According to certain embodiments, transmitting module 1330 may perform certain of the transmitting functions of the apparatus 1300. For example, transmitting module 1330 may transmit the SRS waveform.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 21:
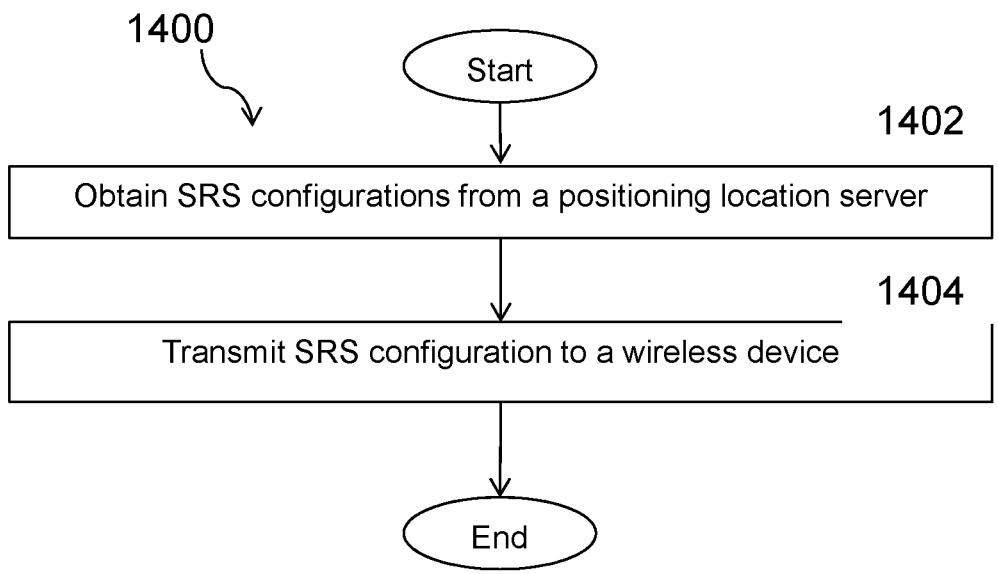
FIG. 21 illustrates an example method by a network node operating as a serving network node in a serving cell, according to certain embodiments.

FIG. 21 depicts a method 1400 by a network node 160 operating as a serving network node in a serving cell, according to certain embodiments. At step 1402, the network node obtains SRS configurations from a positioning location server. At step 1404, the network node transmits an SRS configuration to a wireless device, which may include a UE in a particular embodiment.

Figure 22:
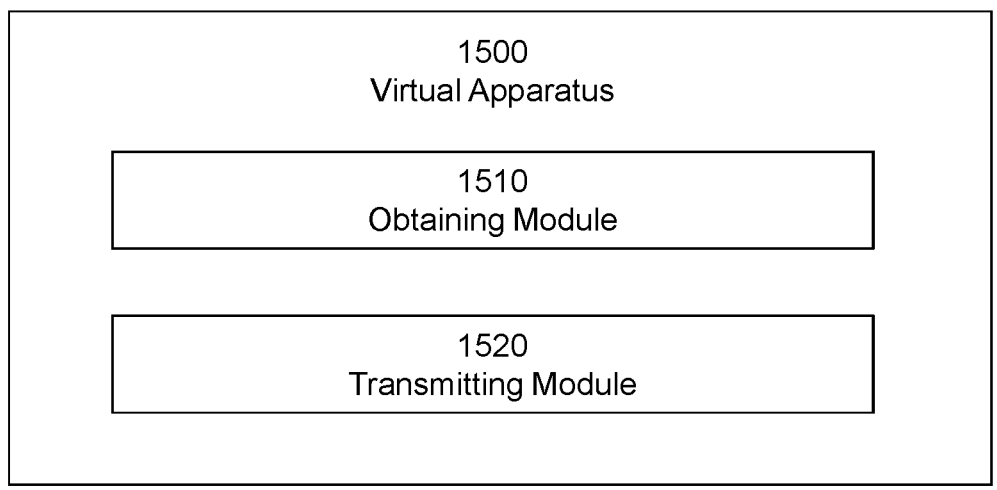
FIG. 22 illustrates another exemplary virtual computing device, according to certain embodiments.

FIG. 22 illustrates a schematic block diagram of a virtual apparatus 1500 in a wireless network (for example, the wireless network shown in FIG. 6). The apparatus may be implemented in a wireless device or network node (e.g., wireless device 110 or network node 160 shown in FIG. 6). Apparatus 1500 is operable to carry out the example method described with reference to FIG. 21 and possibly any other processes or methods disclosed herein. It is also to be understood that the method of FIG. 21 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining module 1510, transmitting module 1520, and any other suitable units of apparatus 1500 to perform corresponding functions according one or more embodiments of the present disclosure.

According to certain embodiments, obtaining module 1510 may perform certain of the obtaining functions of the apparatus 1500. For example, obtaining module 1510 may obtain SRS configurations from a positioning location server.

According to certain embodiments, transmitting module 1520 may perform certain of the transmitting functions of the apparatus 1500. For example, transmitting module 1520 may transmit an SRS configuration to a wireless device, which may include a UE in a particular embodiment.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 23:
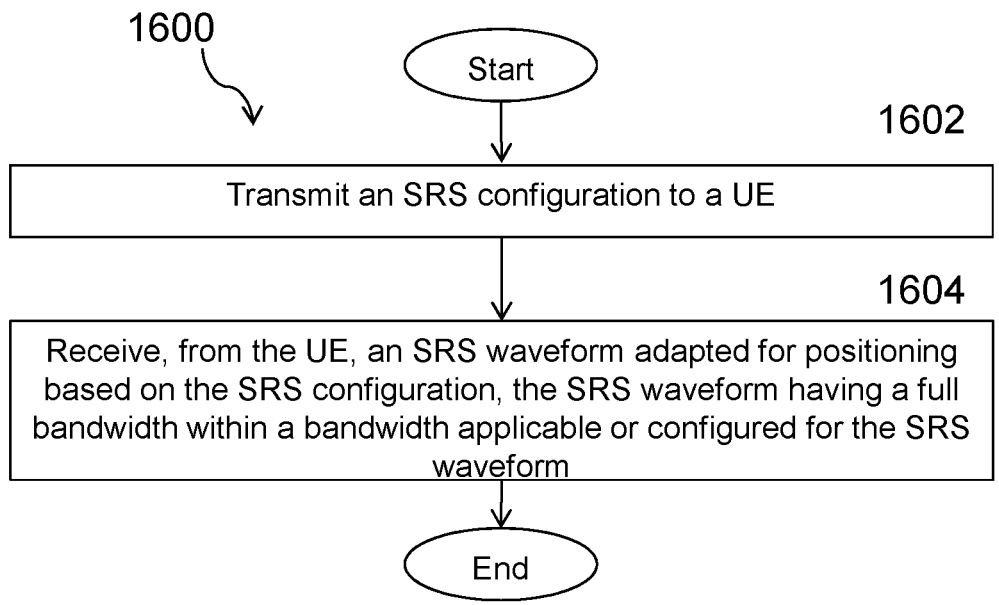
FIG. 23 illustrates a method by a base station, according to certain embodiments.

FIG. 23 depicts a method 1600 by a base station, according to certain embodiments. In a particular embodiment, the base station may include a network node 160. At step 1602, the base station transmits an SRS configuration to a UE 200 or another wireless device 110. At step 1604, the base station receives, from the UE 200, an SRS waveform adapted for positioning based on the SRS configuration The SRS waveform has a full bandwidth within a bandwidth applicable or configured for the SRS waveform.

In a particular embodiment, the SRS waveform uses, for a comb-n SRS resource, every subcarrier in a combination of n symbols, which may include OFDM symbols, for example, in all PRBs applicable for the SRS waveform.

In a particular embodiment, the UE is configured with n comb-n SRS resources, indexed i=0, 1, . . . , n−1, and n is 2 or 4. Each of the n resources is with a different subcarrier shift modulo (i+b, n) where b is 0, 1, . . . , n−1. In a further particular embodiment, each of the n comb-n SRS resources has a duration of an SRS symbol, which may include an OFDM symbol. In a further particular embodiment, n=4 and the four comb-4 SRS resources are of a length of one symbol and are configured to be transmitted in the same slot. In still a further particular embodiment, n=2 and the two comb-2 SRS resources are of a length of two symbols and are configured to be transmitted in the same slot. In yet another particular embodiment, n=4 and the four comb-4 SRS resources are of a length of four symbols and are configured to be transmitted in four different slots. In a further particular embodiment, any one or more of the symbols described herein may be an OFDM symbol.

In a particular embodiment, no group or frequency hopping is configured for the SRS waveform.

In a particular embodiment, frequency hopping is configured for the SRS waveform.

In a particular embodiment, the base station obtains the SRS configuration from a location server, which may include a positioning location server, and adds together a plurality of symbols of the SRS waveform to get a concatenated signal utilizing all subcarriers. The base station performs a positioning measurement based on the SRS waveform and sends the positioning measurement to the location server for use in positioning.

Figure 24:
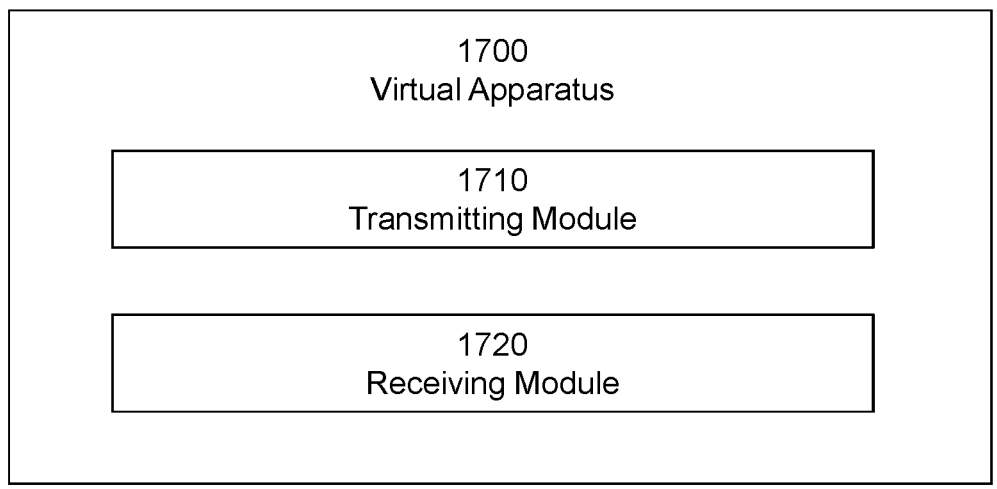
FIG. 24 illustrates another exemplary virtual computing device, according to certain embodiments.

FIG. 24 illustrates a schematic block diagram of a virtual apparatus 1700 in a wireless network (for example, the wireless network shown in FIG. 6). The apparatus may be implemented in a wireless device or network node (e.g., wireless device 110 or network node 160 shown in FIG. 6). Apparatus 1700 is operable to carry out the example method described with reference to FIG. 23 and possibly any other processes or methods disclosed herein. It is also to be understood that the method of FIG. 23 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting module 1710, receiving module 1720, and any other suitable units of apparatus 1700 to perform corresponding functions according one or more embodiments of the present disclosure.

According to certain embodiments, transmitting module 1710 may perform certain of the transmitting functions of the apparatus 1700. For example, transmitting module 1710 may transmit an SRS configuration to a UE 200 or another wireless device 110.

According to certain embodiments, receiving module 1720 may perform certain of the receiving functions of the apparatus 1700. For example, receiving module 1720 may receive, from the UE 200, an SRS waveform adapted for positioning based on the SRS configuration The SRS waveform has a full bandwidth within a bandwidth applicable for the SRS waveform.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 25:
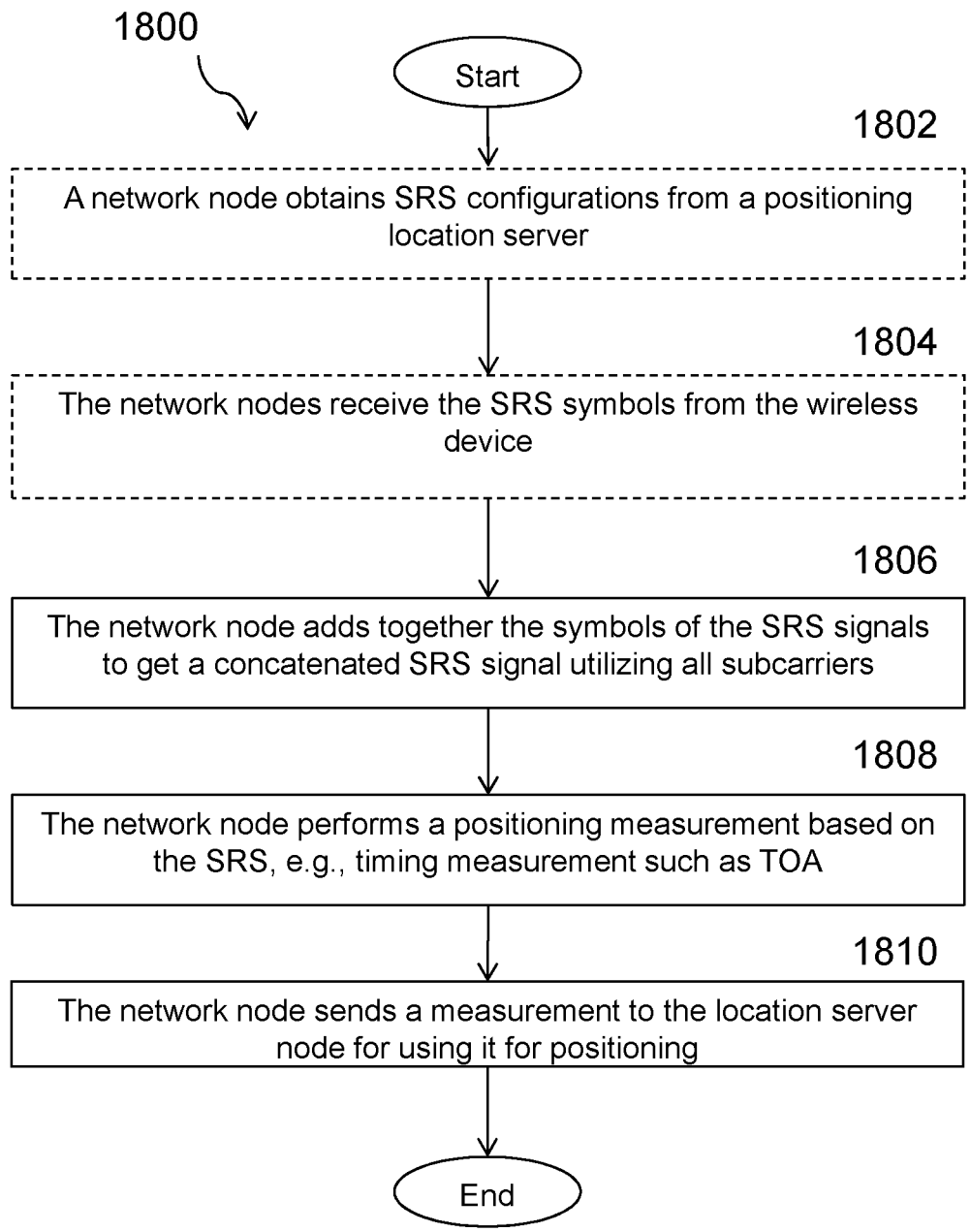
FIG. 25 illustrates a method by a network node from a serving and non-serving cell perspective, according to certain embodiments.

FIG. 25 depicts a method 1800 by a network node from a serving and non-serving cell perspective, according to certain embodiments. At step 1802, a network node obtains SRS configurations from a location server, which may include a positioning location server. At step 1804, the network nodes receive the SRS symbols from a wireless device. At step 1806, the network node adds together the symbols of the SRS signals to get a concatenated SRS signal utilizing all subcarriers. At step 1808, the network node performs a positioning measurement based on the SRS. For example, the network node may perform a timing measurement such as a TOA. At step 1810, the network node sends a measurement to the location server node for use for positioning.

Figure 26:
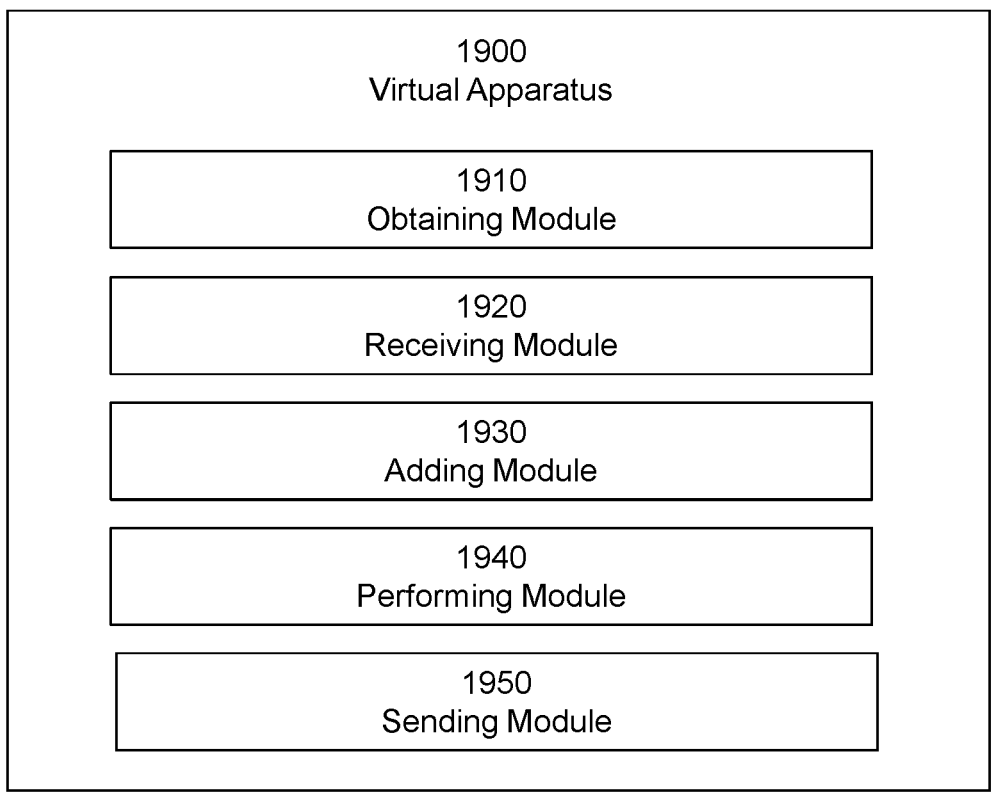
FIG. 26 illustrates another exemplary virtual computing device, according to certain embodiments.

FIG. 26 illustrates a schematic block diagram of a virtual apparatus 1900 in a wireless network (for example, the wireless network shown in FIG. 6). The apparatus may be implemented in a wireless device or network node (e.g., wireless device 110 or network node 160 shown in FIG. 6). Apparatus 1900 is operable to carry out the example method described with reference to FIG. 25 and possibly any other processes or methods disclosed herein. It is also to be understood that the method of FIG. 25 is not necessarily carried out solely by apparatus 1900. At least some operations of the method can be performed by one or more other entities.

Virtual Apparatus 1900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining module 1910, receiving module 1920, adding module 1930, performing module 1940, sending module 1950, and any other suitable units of apparatus 1900 to perform corresponding functions according one or more embodiments of the present disclosure.

According to certain embodiments, obtaining module 1910 may perform certain of the obtaining functions of the apparatus 1900. For example, obtaining module 1910 may obtain SRS configurations from a location server such as, for example, positioning location server.

According to certain embodiments, receiving module 1920 may perform certain of the receiving functions of the apparatus 1900. For example, receiving module 1920 may receive SRS symbols from a wireless device, which may include a UE in a particular embodiment.

According to certain embodiments, adding module 1930 may perform certain of the adding functions of the apparatus 1900. For example, adding module 1930 may add together the symbols of the SRS signals to get a concatenated SRS signal utilizing all subcarriers.

According to certain embodiments, performing module 1930 may perform certain of the performing functions of the apparatus 1900. For example, performing module 1930 may perform a positioning measurement based on the SRS. For example, the network node may perform a timing measurement such as a TOA.

According to certain embodiments, sending module 1940 may perform certain of the sending functions of the apparatus 1900. For example, sending module 1940 may send a measurement to the location server node for use for positioning.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 27:
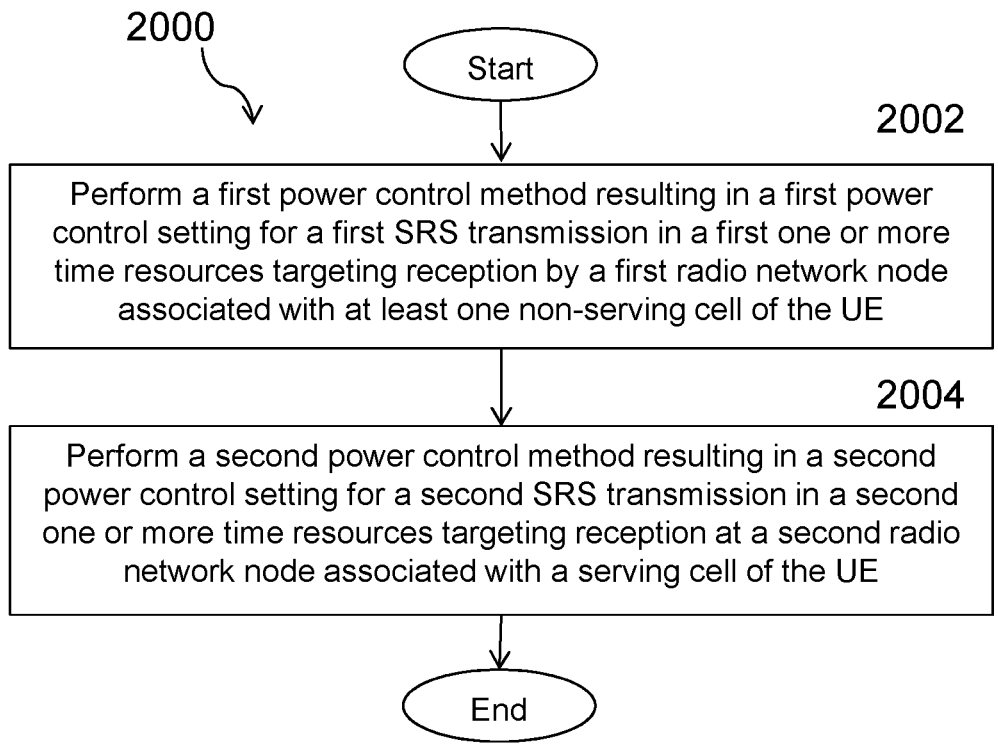
FIG. 27 illustrates another method performed by a UE, according to certain embodiments.

FIG. 27 depicts a method 2000 performed by a UE 200, according to certain embodiments. At step 2002, the UE 200 performs a first power control method resulting in a first power control setting for a first SRS transmission in a first one or more time resources targeting reception by a first radio network node associated with at least one non-serving cell of the UE. At step 2004, the UE 200 performs a second power control method resulting in a second power control setting for a second SRS transmission in a second one or more time resources targeting reception at a second radio network node associated with a serving cell of the UE.

In a particular embodiment, based on the first power control setting, the UE 200 transmits, to the first radio network node 160 associated with the at least one non-serving cell of the UE 200, the first SRS transmission in the first one or more time resources. The first SRS transmission is targeted for reception by the first radio network node 160 associated with the at least one non-serving cell of the UE. Based on the second power control setting, UE 200 transmits, to the second radio network node 160 associated with the serving cell of the UE, the second SRS transmission in the second one or more time resources.

In a particular embodiment, the first power control setting is a higher transmit power level than the second power control setting.

In a particular embodiment, the first SRS transmission is for a positioning purpose.

In a particular embodiment, the first SRS transmission is transmitted in a first spatial direction or via a first beam, and the second SRS transmission is transmitted in a second spatial direction or via a second beam.

In a particular embodiment, an SRS transmission bandwidth associated with the first SRS transmission and the second SRS transmission does not exceed an active bandwidth part of the UE.

In a particular embodiment, the first SRS transmission comprises a combined and/or concatenated set of resource elements over two or more time resources of the first one or more time resources. The first SRS transmission may further comprise a combined full bandwidth transmission.

Figure 28:
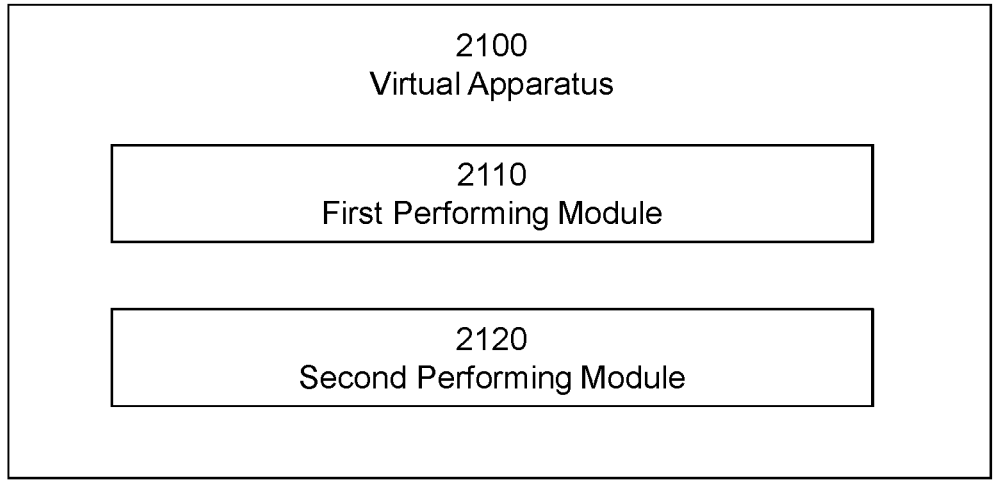
FIG. 28 illustrates another exemplary virtual computing device, according to certain embodiments.

FIG. 28 illustrates a schematic block diagram of a virtual apparatus 2100 in a wireless network (for example, the wireless network shown in FIG. 6). The apparatus may be implemented in a wireless device or network node (e.g., wireless device 110 or network node 160 shown in FIG. 6). Apparatus 2100 is operable to carry out the example method described with reference to FIG. 27 and possibly any other processes or methods disclosed herein. It is also to be understood that the method of FIG. 27 is not necessarily carried out solely by apparatus 2100. At least some operations of the method can be performed by one or more other entities.

Virtual Apparatus 2100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first performing module 2110, second performing module 2120, and any other suitable units of apparatus 2100 to perform corresponding functions according one or more embodiments of the present disclosure.

According to certain embodiments, first performing module 2110 may perform certain of the performing functions of the apparatus 2100. For example, first performing module 2110 may perform a first power control method resulting in a first power control setting for a first SRS transmission in a first one or more time resources targeting reception by a first radio network node associated with at least one non-serving cell of the UE.

According to certain embodiments, second performing module 2120 may perform certain other of the performing functions of the apparatus 2100. For example, second performing module 2120 may perform a second power control method resulting in a second power control setting for a second SRS transmission in a second one or more time resources targeting reception at a second radio network node associated with a serving cell of the UE.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 29:
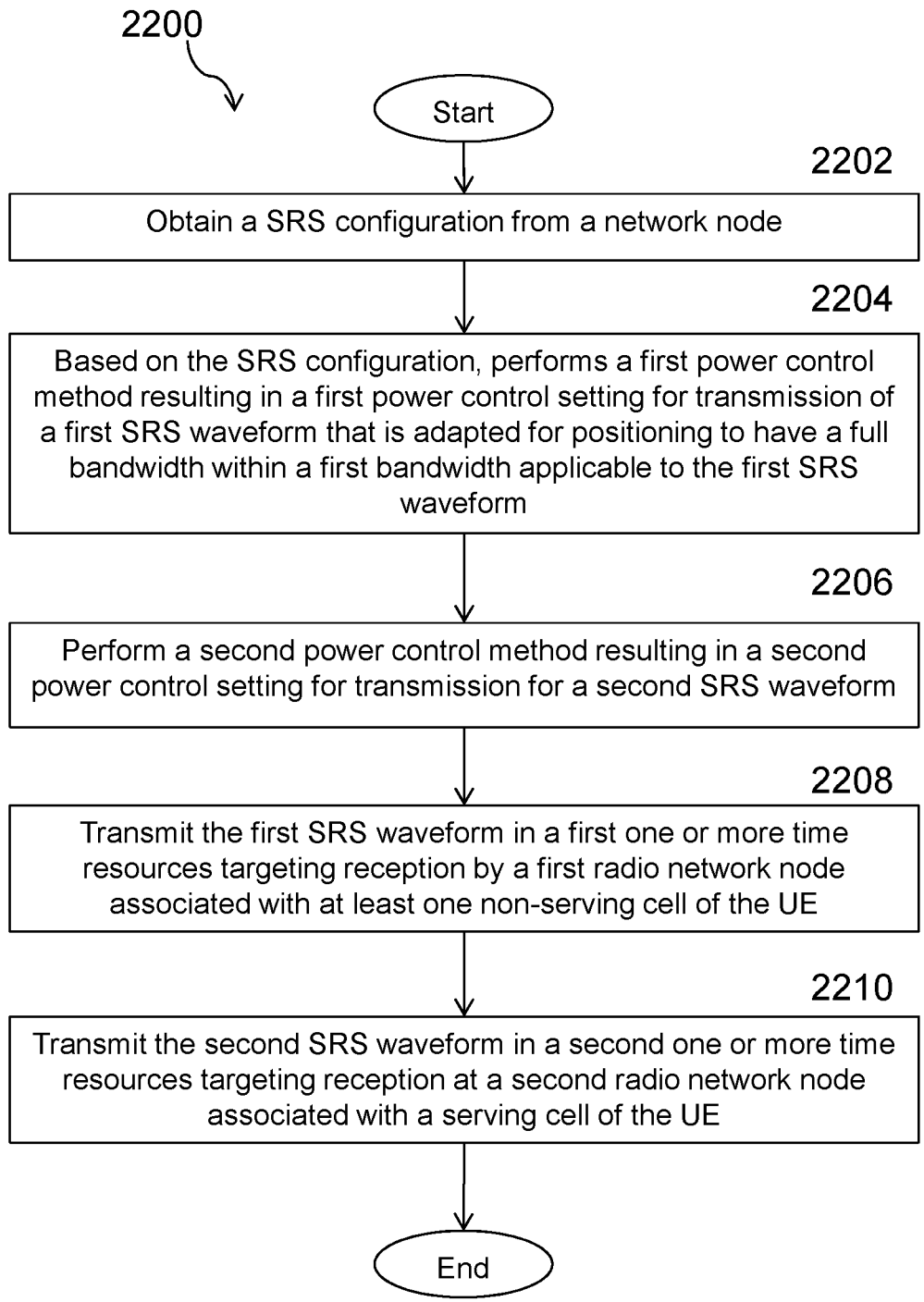
FIG. 29 illustrates another example method performed by a UE, according to certain embodiments.

FIG. 29 depicts a method 2200 performed by a UE 200, according to certain embodiments. At step 2202, the UE 200 obtains a Sounding Reference Signal, SRS configuration from a network node 160, which may include a location server and/or positioning location server. Based on the SRS configuration, the UE 200 performs a first power control method resulting in a first power control setting for transmission of a first SRS waveform, at step 2204. Based on the SRS configuration, the UE 200 performs a second power control method resulting in a second power control setting for a second SRS waveform that is adapted for positioning to have a full bandwidth within a second bandwidth applicable to the second SRS waveform, at step 2206. At step 2208, the UE 200 transmits the first SRS waveform in a first one or more time resources targeting reception by a first radio network node 160 associated with at least one non-serving cell of the UE. At step 2210, the UE 200 transmits the second SRS waveform in a second one or more time resources targeting reception at a second radio network node 160 associated with a serving cell of the UE.

In a particular embodiment, the second SRS waveform is adapted for positioning to have a full bandwidth within a second bandwidth applicable to or configured for the second SRS waveform. The second power control method resulting in the second power control setting for transmission of the second SRS waveform may be performed based on the obtained SRS configuration.

In a particular embodiment, the first power control setting comprises a higher transmit power level than the second power control setting.

In a particular embodiment, the first SRS waveform is transmitted in a first spatial direction or via a first beam and the second SRS waveform is transmitted in a second spatial direction or via a second beam.

In a particular embodiment, an SRS transmission bandwidth associated with the first SRS waveform and the second SRS waveform does not exceed an active bandwidth part of the UE.

In a particular embodiment, the first SRS waveform comprises a combined full bandwidth transmission, and the first SRS waveform comprises a combined and/or concatenated set of resource elements over two or more time resources of the first one or more time resources.

In a particular embodiment, the SRS waveform uses every subcarrier in an Orthogonal Frequency Division Multiplexing, OFDM, symbol in all Physical Resource Blocks, PRBs, applicable for the SRS waveform.

In a particular embodiment, the UE is configured with four comb-n SRS resources, i=0, 1, ..., n; n is 2 or 4; and each of the n resources is with a different subcarrier shift modulo (i+b, n) where b is 0, 1, n. In a further particular embodiment, each of the four comb-n SRS resources comprises an SRS symbol. In a further particular embodiment, n=4 and the four comb-4 SRS resources are of a length of one symbol and are configured to be transmitted in the same slot. In a further particular embodiment, n=2 and the two comb-2 SRS resources are of a length of two symbols and are configured to be transmitted in the same slot. In a further particular embodiment, n=4 and the four comb-4 SRS resources are of a length of four symbols and are configured to be transmitted in four different slots.

In a particular embodiment, no group or frequency hopping is configured for the SRS waveform.

In a particular embodiment, frequency hopping is configured for the SRS waveform.

Figure 30:
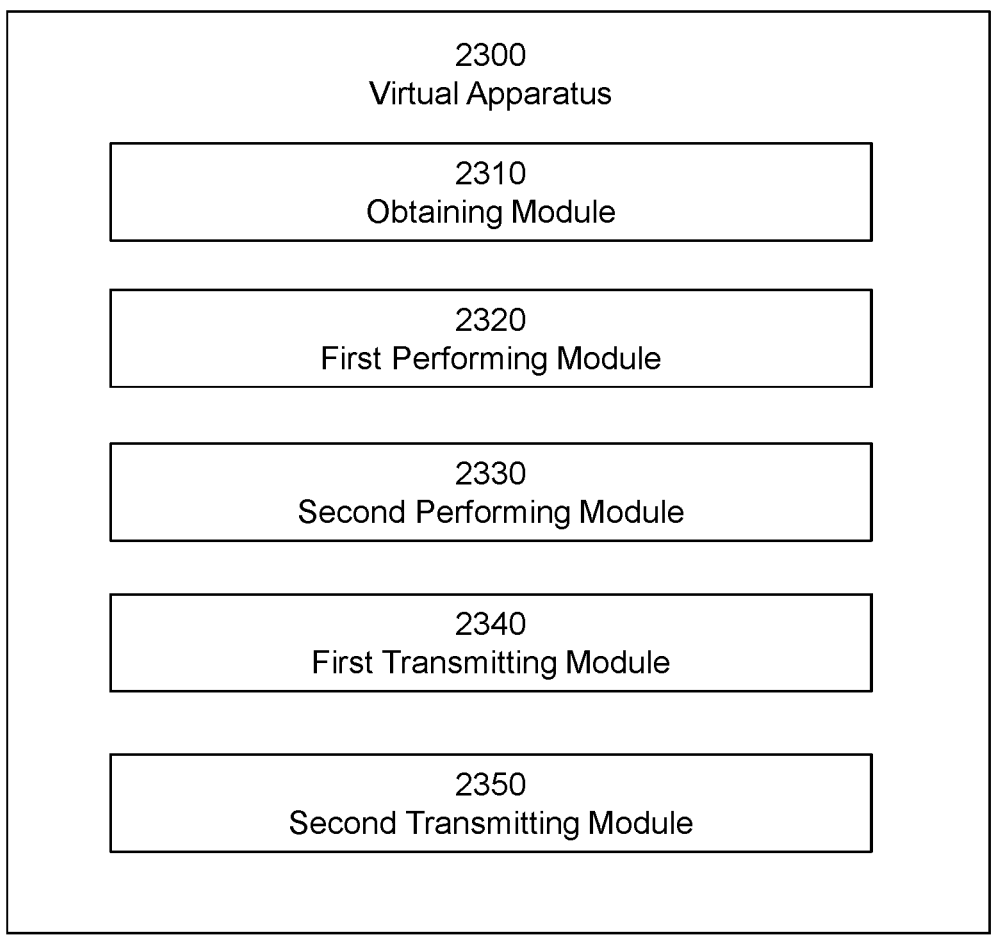
FIG. 30 illustrates another exemplary virtual computing device, according to certain embodiments.

FIG. 30 illustrates a schematic block diagram of a virtual apparatus 2300 in a wireless network (for example, the wireless network shown in FIG. 6). The apparatus may be implemented in a wireless device or network node (e.g., wireless device 110 or network node 160 shown in FIG. 6). Apparatus 2300 is operable to carry out the example method described with reference to FIG. 29 and possibly any other processes or methods disclosed herein. It is also to be understood that the method of FIG. 29 is not necessarily carried out solely by apparatus 2300. At least some operations of the method can be performed by one or more other entities.

Virtual Apparatus 2300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining module 2310, first performing module 2320, second performing module 2330, first transmitting module 2340, second transmitting module 2350, and any other suitable units of apparatus 2300 to perform corresponding functions according one or more embodiments of the present disclosure.

According to certain embodiments, obtaining module 2310 may perform certain of the obtaining functions of the apparatus 2300. For example, obtaining module 2310 may obtain an SRS configuration from a network node 160, which may, in particular embodiments, include a location server and/or positioning location server.

According to certain embodiments, first performing module 2320 may perform certain of the performing functions of the apparatus 2300. For example, based on the SRS configuration, first performing module 2320 may perform a first power control method resulting in a first power control setting for transmission of a first SRS waveform that is adapted for positioning to have a full bandwidth within a first bandwidth applicable to the first SRS waveform.

According to certain embodiments, second performing module 2330 may perform certain other of the performing functions of the apparatus 2300. For example, second performing module 2330 may perform a second power control method resulting in a second power control setting for transmission of a second SRS waveform that is adapted for positioning to have a full bandwidth within a second bandwidth applicable to the second SRS waveform.

According to certain embodiments, first transmitting module 2340 may perform certain of the transmitting functions of the apparatus 2300. For example, first transmitting module 2340 may transmit the first SRS waveform in a first one or more time resources targeting reception by a first radio network node 160 associated with at least one non-serving cell of the UE.

According to certain embodiments, second transmitting module 2350 may perform certain other of the transmitting functions of the apparatus 2300. For example, second transmitting module 2350 may transmit the second SRS waveform in a second one or more time resources targeting reception at a second radio network node 160 associated with a serving cell of the UE.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EXAMPLES

Group A Examples

Example 1. A method performed by a user equipment (UE), the method comprising: obtaining an SRS configuration from a network node; determining a new SRS waveform that is adapted for positioning based on the SRS configuration; and transmitting the new SRS waveform.

Example 2. The method of Example 1, wherein: the wireless device is configured with four comb-n SRS resources, i=0, 1, . . . , n, n is 2 or 4, and each of the n resources is with a different subcarrier shift modulo (i+b, n) where b is 0, 1, . . . n.

Example 3. The method of Example 1, wherein n=4 and the four comb-4 SRS resources are of a length of one symbol and are configured to be transmitted in the same slot.

Example 4. The method of Example 1, wherein n=2 and the two comb-2 SRS resources are of a length of two symbols and are configured to be transmitted in the same slot.

Example 5. The method of Example 1, wherein n=4 and the four comb-4 SRS resources are of a length of four symbols and are configured to be transmitted in four different slots.

Example 6. The method of any one of Examples 1 to 5, wherein no group or frequency hopping is configured for the SRS.

Example 7. The method of any one of Examples 1 to 5, wherein frequency hopping is configured for the SRS.

Group B1 Examples

Example 8. A method performed by a base station, the method comprising: obtaining SRS configurations from a positioning location server; and transmitting an SRS configuration to a UE.

Example 9. The method of Example 8, wherein: the UE is configured with four comb-n SRS resources, i=0, 1, . . . , n; n is 2 or 4; and each of the n resources is with a different subcarrier shift modulo (i+b, n) where b is 0, 1, . . . n.

Example 10. The method of Example 8, wherein n=4 and the four comb-4 SRS resources are of a length of one symbol and are configured to be transmitted in the same slot.

Example 11. The method of Example 8, wherein n=2 and the two comb-2 SRS resources are of a length of two symbols and are configured to be transmitted in the same slot.

Example 12. The method of Example 8, wherein n=4 and the four comb-4 SRS resources are of a length of four symbols and are configured to be transmitted in four different slots.

Example 13. The method of any one of Examples 8 to 12, wherein no group or frequency hopping is configured for the SRS.

Example 14. The method of any one of Examples 8 to 12, wherein frequency hopping is configured for the SRS.

Group B2 Examples

Example 15. A method performed by a base station, the method comprising: obtaining SRS configurations from a positioning location server; receiving the SRS symbols from a UE; adding together the symbols of the SRS signals to get a concatenate signal utilizing all subcarriers; performing a positioning measurement based on the SRS; and sending a measurement to the positioning location server for use in positioning.

Example 16. The method of Example 15, wherein: the UE is configured with four comb-n SRS resources, i=0, 1, . . . , n; n is 2 or 4; and each of the n resources is with a different subcarrier shift modulo (i+b, n) where b is 0, 1, . . . n.

Example 17. The method of Example 15, wherein n=4 and the four comb-4 SRS resources are of a length of one symbol and are configured to be transmitted in the same slot.

Example 18. The method of Example 15, wherein n=2 and the two comb-2 SRS resources are of a length of two symbols and are configured to be transmitted in the same slot.

Example 19. The method of Example 15, wherein n=4 and the four comb-4 SRS resources are of a length of four symbols and are configured to be transmitted in four different slots.

Example 20. The method of any one of Examples 15 to 19, wherein no group or frequency hopping is configured for the SRS.

Example 21. The method of any one of Examples 15 to 19, wherein frequency hopping is configured for the SRS.

Group C Examples

Example 22. A wireless device for improving network efficiency, the wireless device comprising: processing circuitry configured to perform any of the steps of any of the Group A examples; and power supply circuitry configured to supply power to the wireless device.

Example 23. A base station for improving network efficiency, the base station comprising: processing circuitry configured to perform any of the steps of any of the Group B1 or B2 examples; power supply circuitry configured to supply power to the wireless device.

Example 24. A user equipment (UE) for improving network efficiency, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A examples; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Example 25. A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B1 or B2 examples.

Example 26. The communication system of the previous Example further including the base station.

Example 27. The communication system of the previous 2 Examples, further including the UE, wherein the UE is configured to communicate with the base station.

Example 28. The communication system of the previous 3 Examples, wherein: the processing circuitry of the host computer is configured to execute a host application, thereby providing the user data; and the UE comprises processing circuitry configured to execute a client application associated with the host application.

Example 29. A method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of the steps of any of the Group B1 or B2 Examples.

Example 30. The method of the previous Example, further comprising, at the base station, transmitting the user data.

Example 31. The method of the previous 2 Examples, wherein the user data is provided at the host computer by executing a host application, the method further comprising, at the UE, executing a client application associated with the host application.

Example 32. A user equipment (UE) configured to communicate with a base station, the UE comprising a radio interface and processing circuitry configured to performs the of the previous 3 Examples.

Example 33. A communication system including a host computer comprising: processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A Examples.

Example 34a. The communication system of the previous Example, wherein the cellular network further includes a base station configured to communicate with the UE.

Example 34b. The communication system of the previous 2 Examples, wherein: the processing circuitry of the host computer is configured to execute a host application, thereby providing the user data; and the UE's processing circuitry is configured to execute a client application associated with the host application.

Example 35. A method implemented in a communication system including a host computer, a base station and a user equipment (UE), the method comprising: at the host computer, providing user data; and at the host computer, initiating a transmission carrying the user data to the UE via a cellular network comprising the base station, wherein the UE performs any of the steps of any of the Group A Examples.

Example 36. The method of the previous Example, further comprising at the UE, receiving the user data from the base station.

Example 37. A communication system including a host computer comprising: communication interface configured to receive user data originating from a transmission from a user equipment (UE) to a base station, wherein the UE comprises a radio interface and processing circuitry, the UE's processing circuitry configured to perform any of the steps of any of the Group A Examples.

Example 38. The communication system of the previous Example, further including the UE.

Example 39. The communication system of the previous 2 Examples, further including the base station, wherein the base station comprises a radio interface configured to communicate with the UE and a communication interface configured to forward to the host computer the user data carried by a transmission from the UE to the base station.

Example 40. The communication system of the previous 3 Examples, wherein: the processing circuitry of the host computer is configured to execute a host application; and the UE's processing circuitry is configured to execute a client application associated with the host application, thereby providing the user data.

Example 41. The communication system of the previous 4 Examples, wherein: the processing circuitry of the host computer is configured to execute a host application, thereby providing request data; and the UE's processing circuitry is configured to execute a client application associated with the host application, thereby providing the user data in response to the request data.

Example 42. A method implemented in a communication system including a host computer, a base station and a user equipment (UE), the method comprising: at the host computer, receiving user data transmitted to the base station from the UE, wherein the UE performs any of the steps of any of the Group A Examples.

Example 43. The method of the previous Example, further comprising, at the UE, providing the user data to the base station.

Example 44. The method of the previous 2 Examples, further comprising: at the UE, executing a client application, thereby providing the user data to be transmitted; and at the host computer, executing a host application associated with the client application.

Example 45. The method of the previous 3 Examples, further comprising: at the UE, executing a client application; and at the UE, receiving input data to the client application, the input data being provided at the host computer by executing a host application associated with the client application, wherein the user data to be transmitted is provided by the client application in response to the input data.

Example 46. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B1 or B2 Examples.

Example 47. The communication system of the previous Example further including the base station.

Example 48. The communication system of the previous 2 Examples, further including the UE, wherein the UE is configured to communicate with the base station.

Example 49. The communication system of the previous 3 Examples, wherein: the processing circuitry of the host computer is configured to execute a host application; the UE is configured to execute a client application associated with the host application, thereby providing the user data to be received by the host computer.

Example 50. A method implemented in a communication system including a host computer, a base station and a user equipment (UE), the method comprising: at the host computer, receiving, from the base station, user data originating from a transmission which the base station has received from the UE, wherein the UE performs any of the steps of any of the Group A Examples.

Example 51. The method of the previous Example, further comprising at the base station, receiving the user data from the UE.

Example 52. The method of the previous 2 Examples, further comprising at the base station, initiating a transmission of the received user data to the host computer.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
5GS 5G System
5QI 5G QoS Identifier
ABS Almost Blank Subframe
AN Access Network
AN Access Node
ARQ Automatic Repeat Request
AS Access Stratum
AWGN Additive White Gaussian Noise
BCCH Broadcast Control Channel
BCH Broadcast Channel
BW Bandwidth
BWP Bandwidth part
CA Carrier Aggregation
CC Carrier Component
CCCH SDU Common Control Channel SDU
CDMA Code Division Multiplexing Access
CGI Cell Global Identifier
Cell ID Cell Identifier
CIR Channel Impulse Response
CN Core Network
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
CSI RS Channel State Information Reference Signal
D2D Device to Device
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eMBB Enhanced Mobile BroadBand
eNB E-UTRAN NodeB
ePDCCH enhanced Physical Downlink Control Channel
EPS Evolved Packet System
E-SMLC evolved Serving Mobile Location Center
E-UTRA Evolved UTRA
E-UTRAN Evolved Universal Terrestrial Radio Access Network
FDD Frequency Division Duplex
FFS For Further Study
GERAN GSM EDGE Radio Access Network
gNB gNode B (a base station in NR; a Node B supporting NR and connectivity to NGC)
GNSS Global Navigation Satellite System
GSM Global System for Mobile communication
HARQ Hybrid Automatic Repeat Request
HO Handover
HSPA High Speed Packet Access
HRPD High Rate Packet Data
LEE Laptop embedded equipped
LME Laptop mounted equipment
LMU
LOS Line of Sight
LPP LTE Positioning Protocol
LTE Long-Term Evolution
M2M Machine to machine
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NGC Next Generation Core
NG-eNB Next Generation eNodeB
NG-RAN Next Generation Radio Access Network
NPDCCH Narrowband Physical Downlink Control Channel
NR New Radio
NRPA
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PS Packet Switched
PSS Primary Synchronization Signal
PUCCH Physical Uplink Control Channel
PUSCH Physical Uplink Shared Channel
RACH Random Access Channel
QAM Quadrature Amplitude Modulation
RAB Radio Access Bearer
RAN Radio Access Network
RANAP Radio Access Network Application Part
RAT Radio Access Technology RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
RTT
RWR Release with Redirect
SCH Synchronization Channel
SCell Secondary Cell
SCS Subcarrier Spacing
SDU Service Data Unit
SFN System Frame Number
SGW Serving Gateway
SI System Information
SIB System Information Block
SNR Signal to Noise Ratio
S-NSSAI Single Network Slice Selection Assistance Information
SON Self Optimized Network
SRS Sounding Reference Signal
SS Synchronization Signal
SSS Secondary Synchronization Signal
TBS Transport Block Size
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network
ZF Zadoff-Chu sequences

The invention claimed is:

1. A method performed by a user equipment, UE, the method comprising:
obtaining a Sounding Reference Signal, SRS, configuration from a network node;
determining an SRS waveform that is adapted for positioning based on the SRS configuration to have a full bandwidth within a bandwidth configured for the SRS waveform, wherein the SRS waveform is transmitted on every fourth subcarrier of an SRS transmission bandwidth associated with the SRS waveform, wherein a plurality of time resources for the SRS waveform comprises an SRS resource set, wherein the SRS resource set comprises four time resources, and wherein, compared to an SRS transmission in the first time resource in the SRS resource set, a frequency offset for an SRS transmission in the second time resource in the SRS resource set is 2 subcarriers, a frequency offset for an SRS transmission in the third time resource in the SRS resource set is 1 subcarrier, and a frequency offset for an SRS transmission in the fourth time resource in the SRS resource set is 3 subcarriers; and
transmitting the SRS waveform.

2. The method of claim 1, wherein the SRS waveform uses, for a comb value of n (comb-n) SRS resource, wherein n is an integer 4, every subcarrier in a combination of n Orthogonal Frequency Division Multiplexing, OFDM, symbols in all Physical Resource Blocks, PRBs, applicable for the SRS waveform.

3. The method of claim 1, wherein:
the UE is configured with n comb value of n (comb-n) SRS resources, indexed i=0, 1, . . . , n−1, wherein n is an integer 4, and
each of the n resources of the n comb-n SRS resources is with a different subcarrier shift modulo (i+b, n) where b is 0, 1, . . . n−1.

4. The method of claim 3, wherein each of the n comb-n SRS resources of the n comb-n SRS resources has a duration of one OFDM symbol.

5. A method performed by a base station, the method comprising:
transmitting an SRS configuration to a user equipment, UE; and
receiving, from the UE, an SRS waveform adapted for positioning based on the SRS configuration, the SRS waveform having a full bandwidth within a bandwidth configured for the SRS waveform, wherein the SRS waveform is received on every fourth subcarrier of an SRS transmission bandwidth associated with the SRS waveform, wherein a plurality of time resources for the SRS waveform comprises an SRS resource set, wherein the SRS resource set comprises four time resources, and wherein, compared to an SRS transmission in the first time resource in the SRS resource set, a frequency offset for an SRS transmission in the second time resource in the SRS resource set is 2 subcarriers, a frequency offset for an SRS transmission in the third time resource in the SRS resource set is 1 subcarrier, and a frequency offset for an SRS transmission in the fourth time resource in the SRS resource set is 3 subcarriers.

6. The method of claim 5, wherein the SRS waveform uses, for a comb value of n (comb-n) SRS resource, wherein n is an integer 4, every subcarrier in a combination of n Orthogonal Frequency Division Multiplexing, OFDM, symbols in all Physical Resource Blocks, PRBs, applicable for the SRS waveform.

7. The method of claim 5, wherein:
the UE is configured with n comb value of n (comb-n) SRS resources, indexed i=0, 1, . . . , n−1, wherein n is an integer 4, and
each of the n resources of the n comb-n SRS resources is with a different subcarrier shift modulo (i+b, n) where b is 0, 1, . . . n−1.

8. The method of claim 7, wherein each of the n comb-n SRS resources of the n comb-n SRS resources has a duration of one OFDM symbol.

9. The method of claim 7, wherein n=4 and the four comb-4 SRS resources are of a length of one OFDM symbol and are configured to be transmitted in the same slot.

10. The method of claim 7, wherein n=4 and the four comb-4 SRS resources are of a length of four OFDM symbols and are configured to be transmitted in four different slots.

11. The method of claim 5 further comprising:
obtaining the SRS configuration from a location server;
adding together a plurality of symbols of the SRS waveform to get a concatenated signal utilizing all subcarriers;
performing a positioning measurement based on the SRS waveform; and
sending the positioning measurement to the location server for use in positioning.

12. A user equipment, UE, comprising:
processing circuitry
configured to:
obtain a Sounding Reference Signal, SRS, configuration from a network node;
determine an SRS waveform that is adapted for positioning based on the SRS configuration to have a full bandwidth within a bandwidth configured for the SRS waveform, wherein the SRS waveform is transmitted on every fourth subcarrier of an SRS transmission bandwidth associated with the SRS waveform, wherein a plurality of time resources for the SRS waveform comprises an SRS resource set, wherein the SRS resource set comprises four time resources, and wherein, compared to an SRS transmission in the first time resource in the SRS resource set, a frequency offset for an SRS transmission in the second time resource in the SRS resource set is 2 subcarriers, a frequency offset for an SRS transmission in the third time resource in the SRS resource set is 1 subcarrier, and a frequency offset for an SRS transmission in the fourth time resource in the SRS resource set is 3 subcarriers; and
transmit the SRS waveform.

13. The UE of claim 12, wherein the SRS waveform uses, for a comb value of n (comb-n) SRS resource, wherein n is an integer 4, every subcarrier in a combination of n Orthogonal Frequency Division Multiplexing, OFDM, symbols in all Physical Resource Blocks, PRBs, applicable for the SRS waveform.

14. The UE of claim 12, wherein:
the UE is configured with n comb value of n (comb-n) SRS resources, indexed i=0, 1, . . . , n−1, wherein
n is an integer 4, and
each of the n resources of the n comb-n SRS resources is with a different subcarrier shift modulo (i+b, n) where b is 0, 1, . . . n−1.

15. The UE of claim 14, wherein each of the n comb-n SRS resources of the n comb-n SRS resources has a duration of one OFDM symbol.

16. The UE of claim 14, wherein n=4 and the four comb-4 SRS resources are of a length of one OFDM symbol and are configured to be transmitted in the same slot.

17. The UE of claim 14, wherein n=4 and the four comb-4 SRS resources are of a length of four OFDM symbols and are configured to be transmitted in four different slots.

18. A base station comprising:
processing circuitry configured to:
transmit an SRS configuration to a user equipment, UE; and
receive, from the UE, an SRS waveform adapted for positioning based on the SRS configuration, the SRS waveform having a full bandwidth within a bandwidth configured for the SRS waveform, wherein the SRS waveform is received on every fourth subcarrier of an SRS transmission bandwidth associated with the SRS waveform, wherein a plurality of time resources for the SRS waveform comprises an SRS resource set, wherein the SRS resource set comprises four time resources, and wherein, compared to an SRS transmission in the first time resource in the SRS resource set, a frequency offset for an SRS transmission in the second time resource in the SRS resource set is 2 subcarriers, a frequency offset for an SRS transmission in the third time resource in the SRS resource set is 1 subcarrier, and a frequency offset for an SRS transmission in the fourth time resource in the SRS resource set is 3 subcarriers.

19. The base station of claim 18, wherein the SRS waveform uses, for a comb value of n (comb-n) SRS resource, wherein n is an integer 4, every subcarrier in a combination of n Orthogonal Frequency Division Multiplexing, OFDM, symbols in all Physical Resource Blocks, PRBs, applicable for the SRS waveform.

20. The base station of claim 18, wherein:
the UE is configured with n comb value of n (comb-n) SRS resources, indexed i=0, 1, . . . , n−1, wherein
n is an integer 4, and
each of the n resources of the n comb-n SRS resources is with a different subcarrier shift modulo (i+b, n) where b is 0, 1, . . . n−1.

21. The base station of claim 20, wherein each of the n comb-n SRS resources of the n comb-n SRS resources has a duration of one OFDM symbol.

22. The base station of claim 20, wherein n=4 and the four comb-4 SRS resources are of a length of one OFDM symbol and are configured to be transmitted in the same slot.

23. The base station of claim 20, wherein n=4 and the four comb-4 SRS resources are of a length of four OFDM symbols and are configured to be transmitted in four different slots.

* * * * *